Sept. 2, 1947.  H. B. KRAUT ET AL  2,426,621
MACHINE TOOL
Filed Jan. 30, 1943  11 Sheets-Sheet 4

Inventors
Hans B. Kraut
Keith F. Gallimore
Everett O. Morgan
By Parker, Carlson, Pitzner & Hubbard
ATTORNEYS Sept. 2, 1947.  H. B. KRAUT ET AL  2,426,621
MACHINE TOOL
Filed Jan. 30, 1943   11 Sheets-Sheet 5

Inventors
Hans B. Kraut
Keith F. Gallimore
Everett K. Morgan
By Parker, Carlson, Pigman & Hubbard
ATTORNEYS

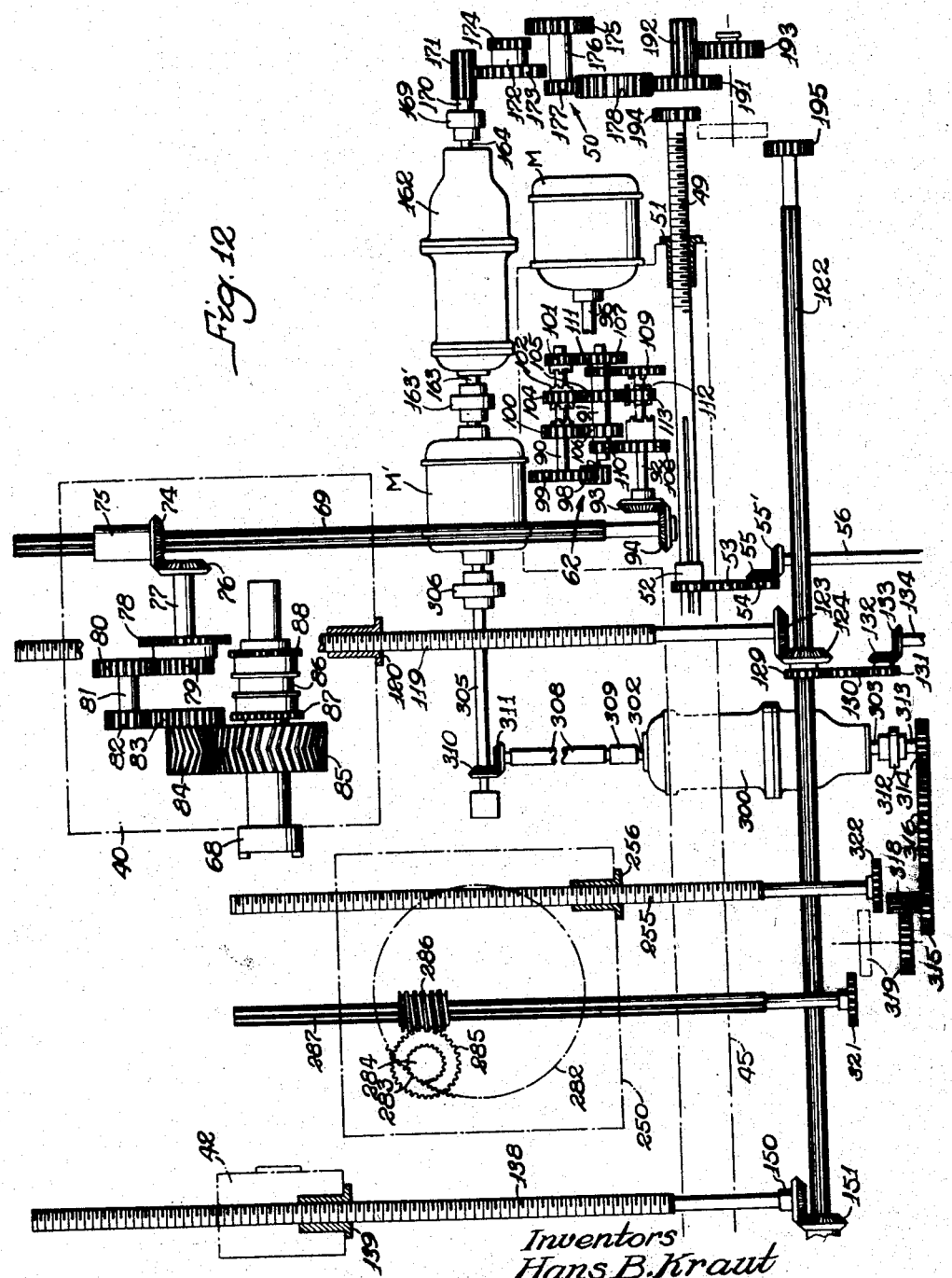

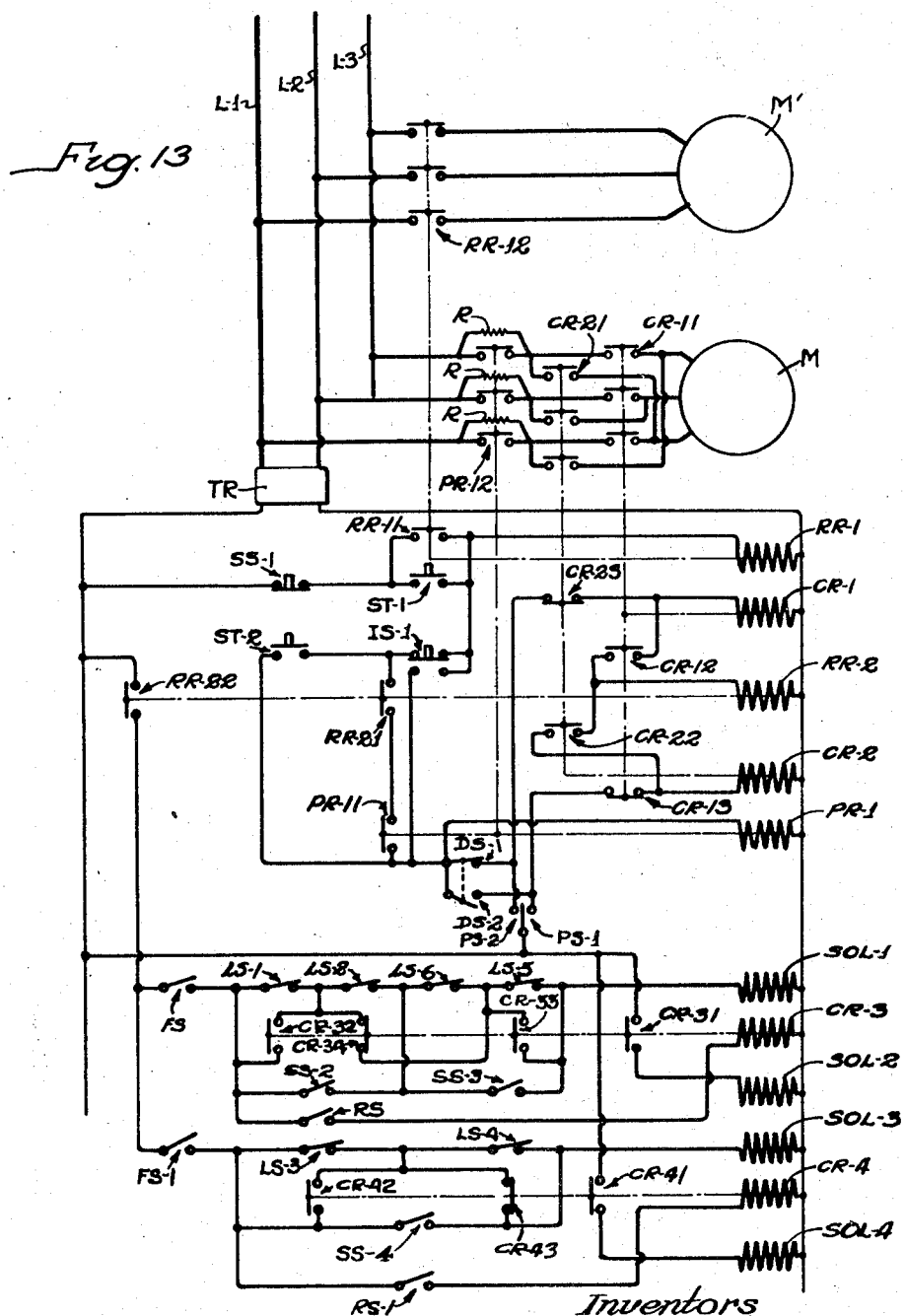

Patented Sept. 2, 1947

2,426,621

UNITED STATES PATENT OFFICE 2,426,621

MACHINE TOOL

Hans B. Kraut, Keith F. Gallimore, and Everett K. Morgan, Fond du Lac, Wis., assignors to Giddings & Lewis Machine Tool Co., Fond du Lac, Wis., a corporation of Wisconsin Application January 30, 1943, Serial No. 474,068

16 Claims. (Cl. 77—3)

The invention relates to machine tools and more particularly to machines of the type commonly known as horizontal boring, drilling and milling machines.

The general object of the invention is to provide a large size horizontal boring, drilling and milling machine adapted for heavy duty use and capable of operating with greater precision than machines of this general character as heretofore constructed.

More specifically stated, one object of the invention is to provide a heavy duty horizontal boring, drilling and milling machine in which the headstock and tailstock column are mounted on a translatable table or platen for movement as a unit relative to the work whereby extremely rigid support is provided for the tool carrying elements and the work throughout the machine operation.

Another object is to provide a machine structure in which the supports for a boring bar or similar tool are movable as a unit with the bar thereby avoiding the sliding of the bar through the tailstock or end support and providing uniform support therefore throughout the machine cycle.

Another object is to provide improved drive mechanism for machines of the above general character adapted to materially increase their flexibility and extend their range of operation.

A further object is to provide an improved system of control for such machine tools.

Still another object is to provide improved safety controls effective to prevent jamming of relatively movable machine elements where one element carries a part adjustable in the direction of relative movement.

Other objects and advantages of the invention will become apparent from the following detailed description of the preferred embodiment illustrated in the accompanying drawings in which:

Fig. 9 is a sectional view of the end support taken in a vertical plane substantially along the line 9—9 of Fig. 2.

Fig. 10 is a vertical sectional view of the platen speed and direction control mechanism taken along the line 10—10 of Fig. 1.

Fig. 11 is a vertical sectional view of the work support speed and direction control mechanism taken along the line 11—11 of Fig. 7.

Fig. 12 is a diagrammatic layout of the spindle drive transmission and the various feed mechanisms of the machine.

Fig. 13 is a wiring diagram of the electrical operating and control circuits of the machine.

Figure 1:
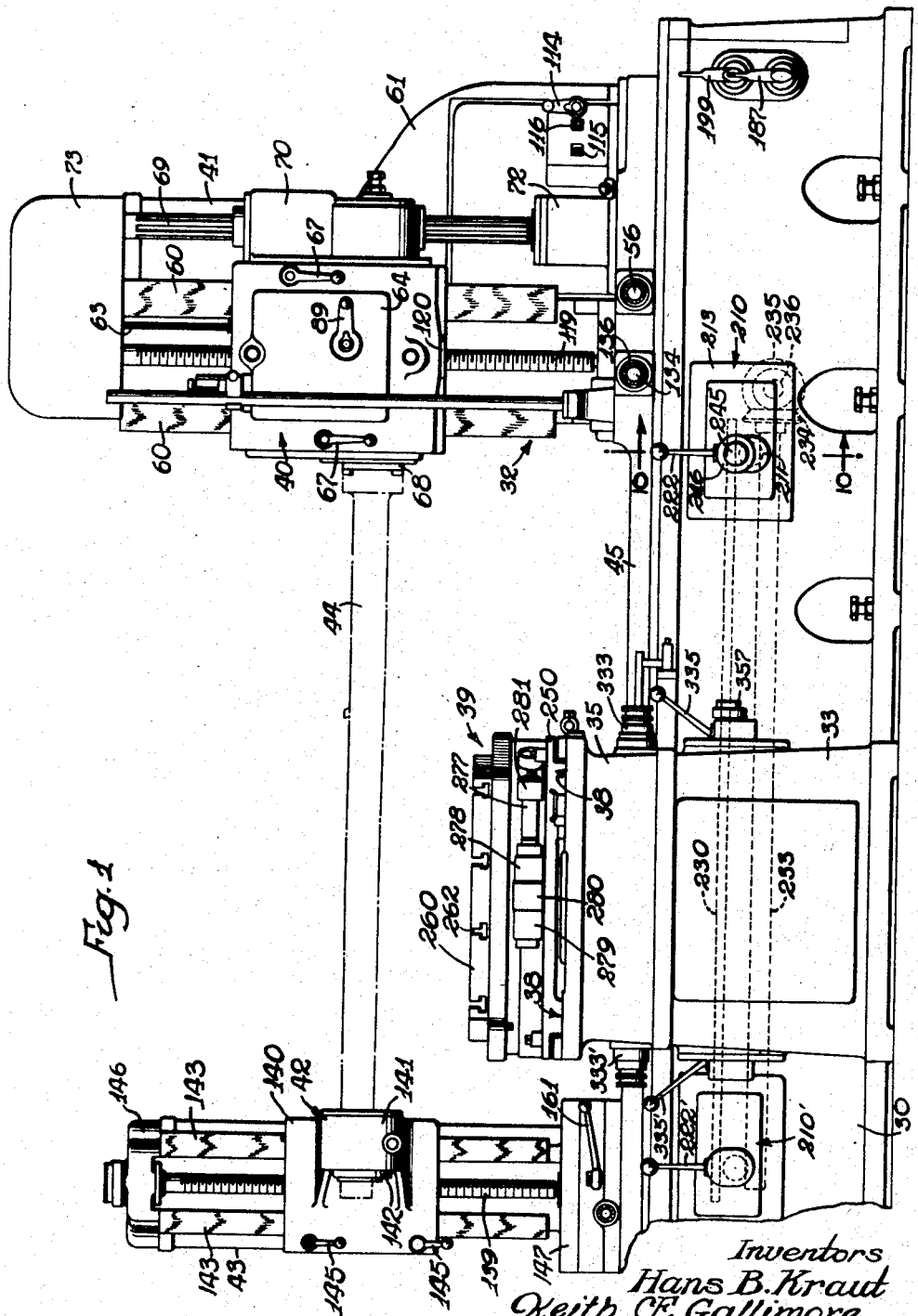
Fig. 1 is a front elevational view of a horizontal boring, drilling and milling machine embodying the features of the invention.

While the invention is susceptible of various modifications and alternative constructions, I have shown in the drawings and will herein describe in detail the preferred embodiment, but it is to be understood that I do not intend to limit the invention to the specific form disclosed but intend to cover all modifications and alternative constructions falling within the spirit and scope of the invention, as expressed in the appended claims.

General machine organization

Referring now to the drawings, the machine constituting the exemplary embodiment of the invention comprises an elongated main base or bed 30 (Figs. 1–5) having horizontal guides or ways 31 (Figs. 2, 6 and 8) on its upper face for a tool supporting structure indicated generally at 32. Auxiliary bed members 33 and 34 (Figs. 1, 4 and 8) extending from the front and rear of the main bed 30 respectively, approximately midway between the ends thereof, support opposite ends of a bridging member 35 (Figs. 2, 7 and 8) which extends transversely of the main bed and over the ways 31. The bridging member, as shown in Fig. 8, comprises an elongated bed member having integrally formed pedestals 36 and 37 adapted to rest on the auxiliary bed members 33 and 34 whereby substantial clearance is provided between the ways 31 and the central sections of the bed member. The latter is provided on its upper face with horizontal guides or ways 38 (Figs. 1, 2 and 7) for a shiftable work support 39.

Tool supporting structure

The tool support 32 is constructed and arranged in a novel manner to provide extremely rigid vibrationless support for the tool so that the work may be machined with a high degree of precision. Like conventional heavy duty horizontal boring machines, the machine comprising the invention is provided with a spindle headstock 40 (Figs. 1-4 and 6) supported on an upright column 41 and a tailstock or end support 42 carried on an upright column 43 and cooperating in well-known manner with the headstock to support a tool such as a boring bar 44. In the present instance, however, the headstock column 41 and the tailstock column 43 are mounted to move as a unit with a platen 45 adapted to slide beneath the work support and the ways 31. The columns located at opposite sides of the work support are thus enabled to securely hold both ends of the tool throughout a machining operation.

The platen 45 is in the form of a flat, generally rectangular table and may be of any preferred construction. Sliding support for the platen is provided by spaced parallel depending ways 46 (Figs. 6 and 8) having their lower faces machined to form bearings for engagement with the ways 31. Preferably these bearing surfaces extend the full length of the platen and under both the headstock and tailstock columns so that the cutting element of the tool does not overhang or extend beyond the point of support at any time. Moreover, the weight of the tool supporting structure is distributed over a relatively long surface so that a very rigid support is obtained. Gib plates 47 secured to flanges upstanding at the outer edges of the respective ways 31 and engaging in outwardly facing grooves in the sides of the platen act to hold the latter securely on the ways. To guide the platen in its movements, a guide flange 48 upstanding from the bed 30 adjacent one of the ways is adapted to coact with a vertical guide surface on adjacent rib 46 of the platen.

Provision is made for feeding the platen along the ways by power in either direction and at any selected one of a large number of feeding rates. The feed is effected, in this instance by means of a feed screw 49 adapted to be driven by a speed change mechanism 50 (Figs. 5 and 12) to be described in detail hereinafter. The feed screw is arranged below the platen parallel to the ways 31 and is rotatably supported at opposite ends on the main bed 30. A feed nut 51 fixed to the platen cooperates with the feed screw to impart forward or return movements to the platen in accordance with the direction of rotation of the screw.

Means is also provided for feeding the platen by hand for effecting fine adjustments or the like. This means, as herein shown comprises a gear 52 (Fig. 12) mounted on the feed screw 49 for movement axially thereof but held against rotation by a key or the like. The gear 52 is rotatably anchored on the platen and meshes with an idler gear 53 which in turn meshes with a gear 54 having a bevel gear 55 rigid therewith. Meshing with the gear 55 is a bevel gear 55' fast on a horizontal shaft 56 projecting at the front of the platen for attachment of a hand crank. Thus, by turning the crank, the screw 49 may be rotated through the gearing above described to drive the platen in either a forward or reverse direction.

The headstock column 41 is bolted or otherwise rigidly secured on the upper face of the platen adjacent its right end as viewed in Fig. 1. The section of the platen supporting the column is extended somewhat above the upper face of the remainder of the platen to provide space for accommodating the manual traverse mechanism above described. To permit adjustment of the relative spacing of the headstock and tailstocks for accommodating workpieces of different widths, the tailstock column 43 is adjustably secured to the platen. The means provided for this purpose, as herein shown, comprises a dovetail slide 58 (Fig. 9) engaging in complementary dovetail grooves or ways 59 in the face of the platen.

Figure 2:
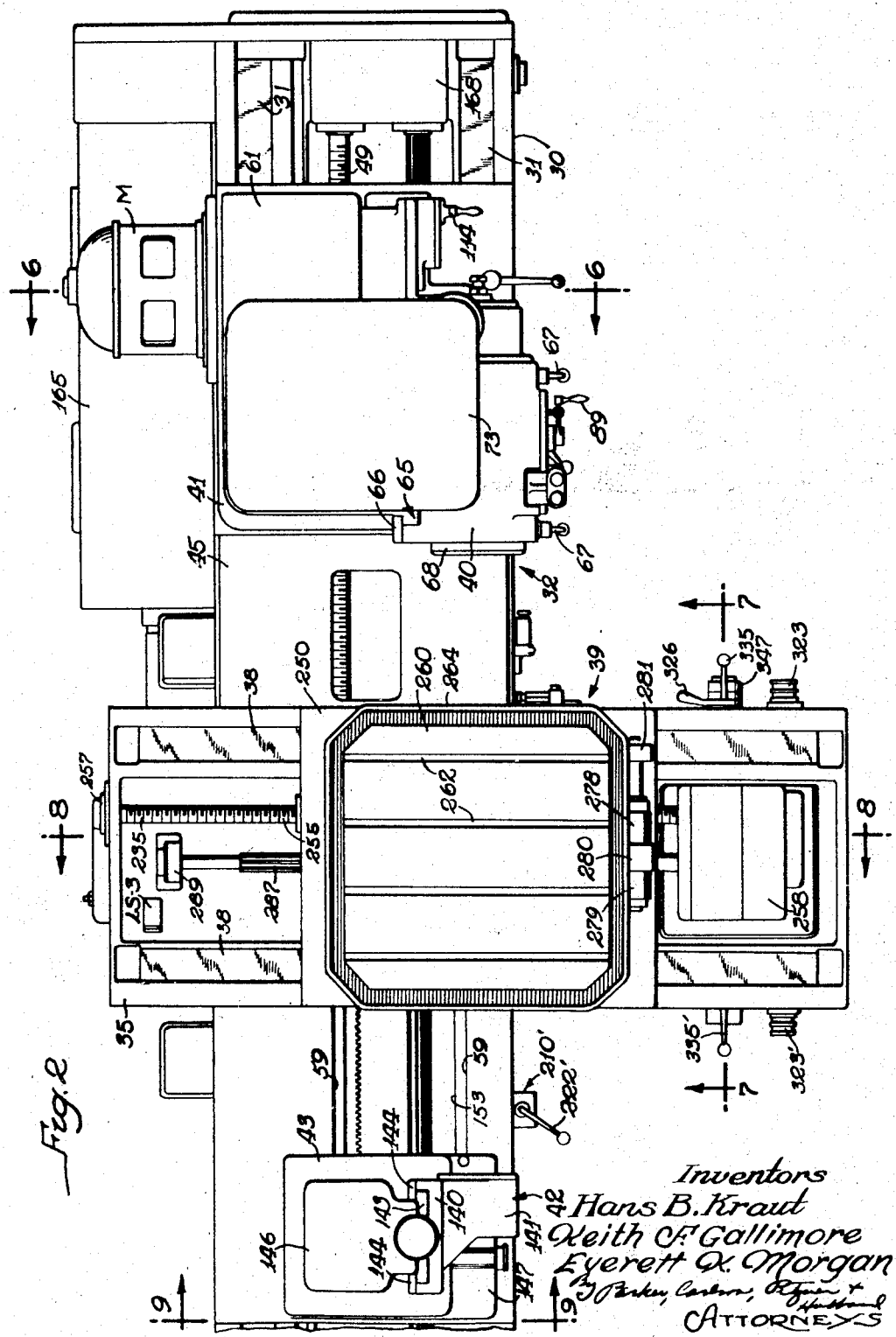
Fig. 2 is a plan view of the machine.

The headstock column, as herein shown, is a hollow, elongated casting formed with spaced parallel guides or ways 60 on its front face for guiding the headstock 40 in its vertical movement. The lower or base portion of the column is extended at one side as shown in Figs. 1 and 2 to form a housing 61 for a spindle driving transmission 62. The upper portion of the column, which is generally rectangular in horizontal cross section encloses a counterweight (not shown) for the headstock 40 connected thereto by a roller chain 63.

The headstock 40 may be of conventional construction and as herein shown, comprises a casing of generally rectangular form closed at the front by a removable cover plate 64. Spaced guides 65 (Fig. 2) are fashioned on the rear face of the casing for cooperation with the ways 60 on the column. Removable gib plates 66 secured to the casing overlap the rear face of the ways 60 and assist in guiding the headstock in its movements on the ways. Suitable clamping devices (not shown) actuated in well-known manner by hand levers 67 are provided for clamping the headstock in any selected position on the ways.

Figure 3:
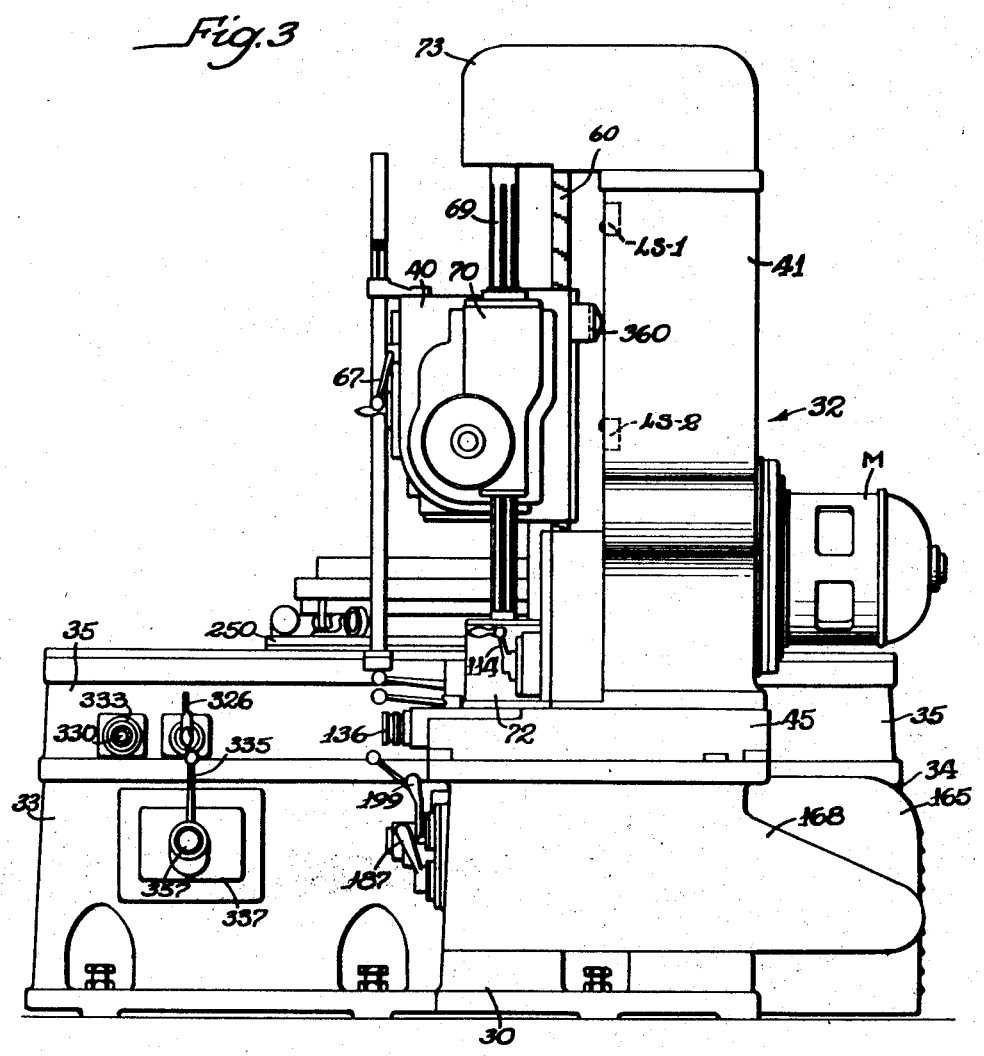
Fig. 3 is an elevational view looking toward the headstock end of the machine.

Journaled in the headstock casing with one end projecting laterally therefrom is a horizontally disposed spindle 68 (Figs. 1, 4 and 12) having the usual socket for the reception of the boring bar 44 or other suitable tool. The spindle is rotatably driven by the transmission 62 through a vertical drive shaft 69 and suitable gearing enclosed in the headstock casing. The drive shaft is located adjacent the side of the casing opposite the projecting end of the spindle and is arranged to project through a housing 70 integral with or rigidly secured to the side wall of the casing. As herein shown, the drive shaft is rotatably supported at its lower end in suitable bearings 71 in an extension 72 at the front of the transmission housing 61. The upper end of the shaft is journaled in a cap member 73 rigidly secured to the top of the column 41 and arranged to project forwardly therefrom to overhang the headstock as shown in Fig. 3.

A driving connection between the vertical shaft 69 and the spindle 68 is provided by the gearing in the headstock above mentioned. As shown in Fig. 12, this gearing includes a bevel gear 74 journaled in the housing 70 and having a rigid sleeve 75 splined to the drive shaft. The gear 74 meshes with a gear 76 fast on a shaft 77 rotatably supported in the headstock casing parallel with the axis of the spindle. Provision is made for effecting a driving connection between the shaft 77 and the spindle either directly or through back gears so as to provide two different speed ranges. To this end the shaft 77 carries a pair of gears 78 and 79, the latter of which is in constant mesh with a gear 80 fast on a shaft 81. A pinion 82 also fast on the shaft 81 drives a gear 83 which has a rigid pinion 84 meshing with a large or bull gear 85 rotatably supported on the spindle. The pinion 84 and gear 85 are preferably of the double helical type so as to minimize end thrust on the spindle.

Slidably mounted on the spindle but splined thereto is a double clutch sleeve 86 having clutch teeth 87 at one end adapted to coact with similar clutch teeth in the adjacent face of the bull gear 85. Gear teeth 88 formed on the other end of the sleeve are adapted to mesh with the gear 78 which, as previously described, is fast on the shaft 77. Thus, by sliding the clutch sleeve to the left (as viewed in Fig. 12) a driving connection is established between the bull gear and the spindle so that the latter is rotated in the low speed range through the medium of the back gears 79—85. Shifting of the clutch sleeve to the right to mesh the gears 78 and 88 establishes a direct driving connection between the shaft 77 and the spindle whereby the spindle is driven in the high speed range. The clutch sleeve may also be set in the intermediate or neutral position in which it is shown in the drawing so as to interrupt the spindle drive. Any suitable means, such as a hand lever 89 (Figs. 1, 3 and 4) may be utilized for shifting the clutch sleeve.

The transmission 62 by which the vertical shaft 69 is driven may be of any suitable type. The particular machine illustrated is provided with a transmission of the nine-speed type similar to that disclosed in the Schurger Patent No. 2,269,290, granted January 6, 1942. Briefly described, this transmission comprises an inlet shaft 90 (Figs. 6 and 12) an intermediate shaft 91 and an outlet shaft 92 with suitable clutches and gearing for interconnecting these shafts in nine different speed transmitting ranges. The shafts are all rotatably supported in a suitable frame 61' enclosed within the housing 61.

Figure 6:
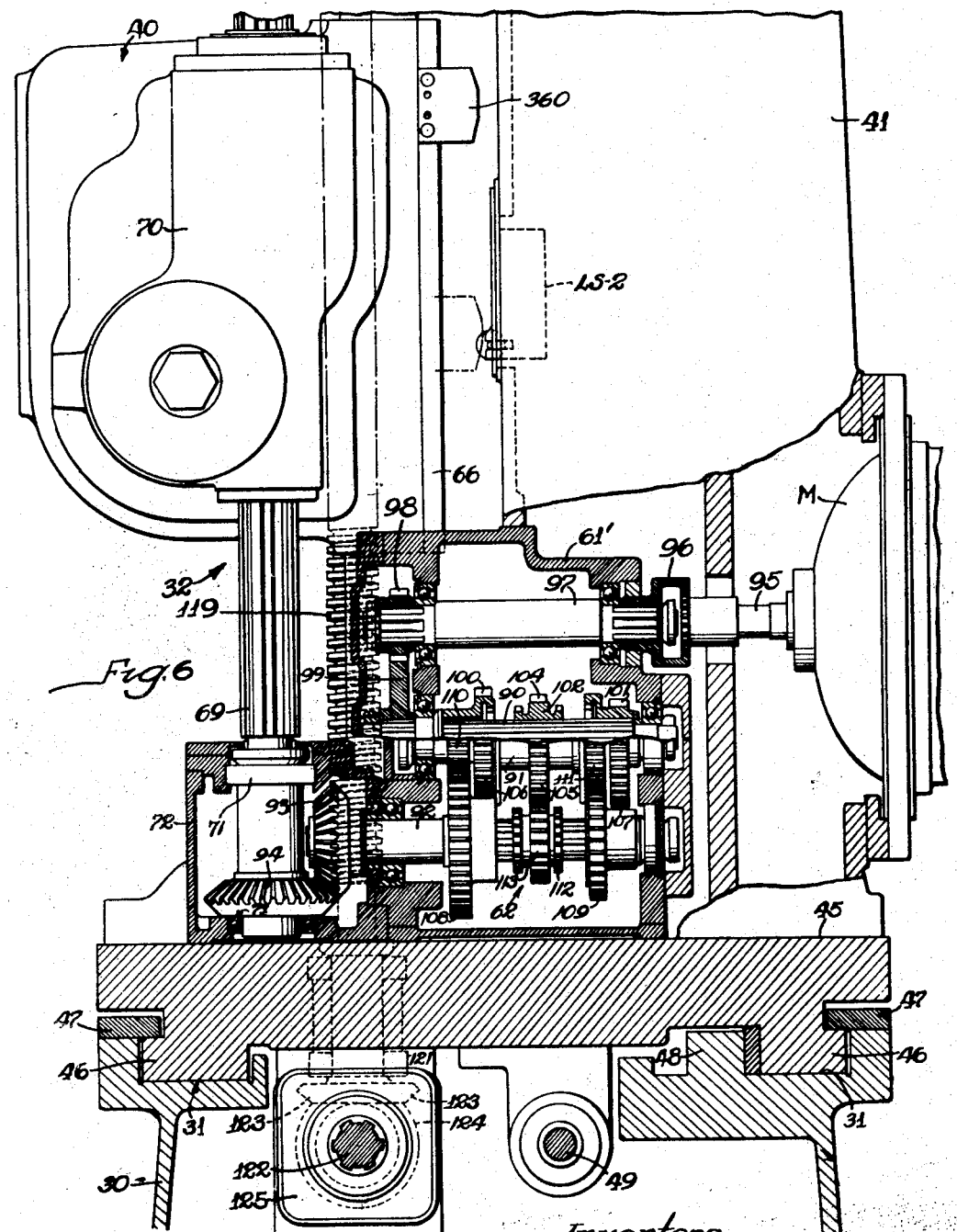
Fig. 6 is a transverse sectional view of the headstock column taken in a vertical plane substantially along the line 6—6 of Fig. 2 showing details of the spindle driving transmission.

Referring more particularly to Figs. 6 and 12 of the drawings, the outlet shaft 92 of the transmission is connected with the shaft 69 by bevel gears 93 and 94. The inlet shaft 90 is driven by a reversible electrical motor M herein shown as flange mounted on the rear wall of the headstock column 41 with its shaft 95 projecting into the transmission housing. A coupling 96 connects the motor shaft with a driving shaft 97 journaled in the frame 61' and having a pinion 98 meshing with a gear 99 keyed to the inlet shaft 90.

Loosely journaled on the inlet shaft 90 are a pair of end gears 100 and 101 adapted to be alternatively coupled to the shaft by a centrally disposed clutch member in the form of a sleeve 102 splined to the shaft. Rigid with the clutch sleeve is a gear 104 adapted when the clutch is in a central position and disengaged from both of the end gears, to mesh with a gear 105 fast on the intermediate shaft 91. Gears 106 and 107 also fast on the shaft 91 are in constant mesh with the end gears 100 and 101 respectively. Thus by appropriately shifting the clutch sleeve 102 any one of three driving connections each with a different gear ratio may be established selectively between the inlet shaft 90 and the intermediate shaft 91.

A similar clutch and gear arrangement provides three selectively engageable driving connections between the intermediate shaft 91 and the outlet shaft 92. Thus, gear 108 and 109 loosely journaled on the shaft 92 mesh with pinions 110 and 111 respectively fast on the shaft 91. A central clutch member or sleeve 112 splined on the shaft 92 is shiftable to couple either gear 108 or 109 to the shaft. Moreover, the clutch sleeve has an integral gear 113 engageable with the gear 105 when the sleeve is located in its central or neutral position.

Since the clutch members are shiftable independently and since each provides connections of three different gear ratios between their respective shafts and the intermediate shaft, it will be apparent that the outlet shaft may be driven from the inlet shaft at any one of nine progressively different speeds. It will be recalled that the gearing in the headstock includes additional means for selecting between a high and low speed range, thus doubling the range of the transmission 62 or, in other words, providing eighteen progressively different speeds for the spindle 68. It will be understood that additional speed changes may be obtained, if desired, by varying the speed of the driving motor M.

Any suitable means may be utilized for shifting the clutch members 102 and 112. Shifting mechanism of the type disclosed in the Schurger patent above referred to is preferred since the different driving ratios may be established progressively by simply turning a hand crank 114 (Figs. 1, 2, 3 and 5) projecting at the front of the transmission housing. The particular driving ratio in effect at any time is visually indicated by a suitable indicator associated with the shifting mechanism and arranged to display appropriate indicia through two openings or windows 115 and 116 in the front wall of the housing. The indicator is ordinarily calibrated so that the indicia displayed through the window 115 shows the speed at which the spindle is driven in the low speed range, that is, when the back gears of the headstock are engaged. The indicia displayed in the window 116 shows the spindle speed in the high speed range or when the drive is taken directly from the shaft 77.

Provision is made for feeding the headstock 40 vertically either by power or manually, as desired. The feed mechanism as herein shown, includes a vertical feed screw 119 (Figs. 1, 6 and 12) threaded into a nut 120 carried on the headstock casing. The feed screw extends into the cap member 73 and is rotatably anchored therein in any suitable manner. At its lower end the feed screw is journaled in bearings 121 (Fig. 6) carried on the platen 45 and is arranged to be drivingly connected with a splined shaft 122 extending longitudinally of the machine bed below the platen. The connection is provided in this instance by a bevel gear 123 fixed on the end of the feed screw and meshing with a bevel gear 124 splined on the shaft. The latter gear is rotatably anchored in a casing 125 rigid with the platen so that the gear travels along with the platen in its movements on the ways and is operative to transmit power to the feed screw in any position of the platen.

The shaft 122 is journaled at opposite ends in suitable bearings 126 (Fig. 5) carried on the machine bed 30 at opposite ends of the ways. Power is applied to the shaft at the head end of the bed through the medium of the feed mechanism 50 (Figs. 5 and 12) which is adapted to be coupled selectively to the shaft or to the platen feed screw 49 as will appear presently.

Means is also provided for manually rotating the shaft 122 to facilitate accurate positioning of the headstock when initially setting up the machine. The manual operable means, as shown in Fig. 12, includes a gear 129 rigid with the bevel gear 124 and meshing with an idler gear 130 rotatably mounted in a suitable compartment in the platen 45. The gear 130, in turn, meshes with a gear 131 rigid with a bevel gear 132 meshing with a bevel gear 133. The latter gear is keyed to a shaft 134 arranged to project at the front of the platen and having its projecting end suitably shaped for the engagement of a hand crank by which the shaft may be turned. A guard 136 (Figs. 1, 3 and 5), open at the outer end to permit entry of the crank, encloses the projecting end of the shaft to prevent accidental contact with the shaft when the power feed is in use.

The mechanism above described for traversing the headstock is also utilized for traversing the tailstock 42 in synchronism therewith. Vertical movements are imparted to the tailstock through the medium of a feed screw 138 coacting with a stationary nut 139 (Fig. 12) carried on the tailstock. The latter as herein shown, comprises a generally rectangular block 140 (Figs. 1 and 2) having a forwardly projecting bracket 141 holding a sleeve or bushing 142 for rotatably supporting the outer end of the tool bar 44. Parallel spaced guideways are fashioned on the rear face of the block 140 for cooperation with vertically disposed guides or ways 143 on the front face of the tailstock column 43. Removable gib plates 144 secured to the block are arranged to overlap the rear face of the ways 143 to assist in guiding the tailstock in its movements. Suitable clamps operated by hand levers 145 are provided for locking the tailstock in any adjusted position.

The tailstock column 43 is preferably in the form of a hollow, elongated casting of generally rectangular horizontal cross section. The ways 143 are formed on the front face of this column and the feed screw is arranged to extend upwardly between the ways. At its upper end the feed screw is rotatably anchored in a cap member 146 bolted or otherwise rigidly secured to the top of the column. The lower end of the column is preferably formed as a separate generally rectangular base 147 to which the column portion may be bolted or otherwise rigidly secured. A key 148 (Fig. 9) projecting from the upper face of the base engages in a keyway in the bottom of the column portion to accurately locate the latter with respect to the base.

Figures 9, 10:
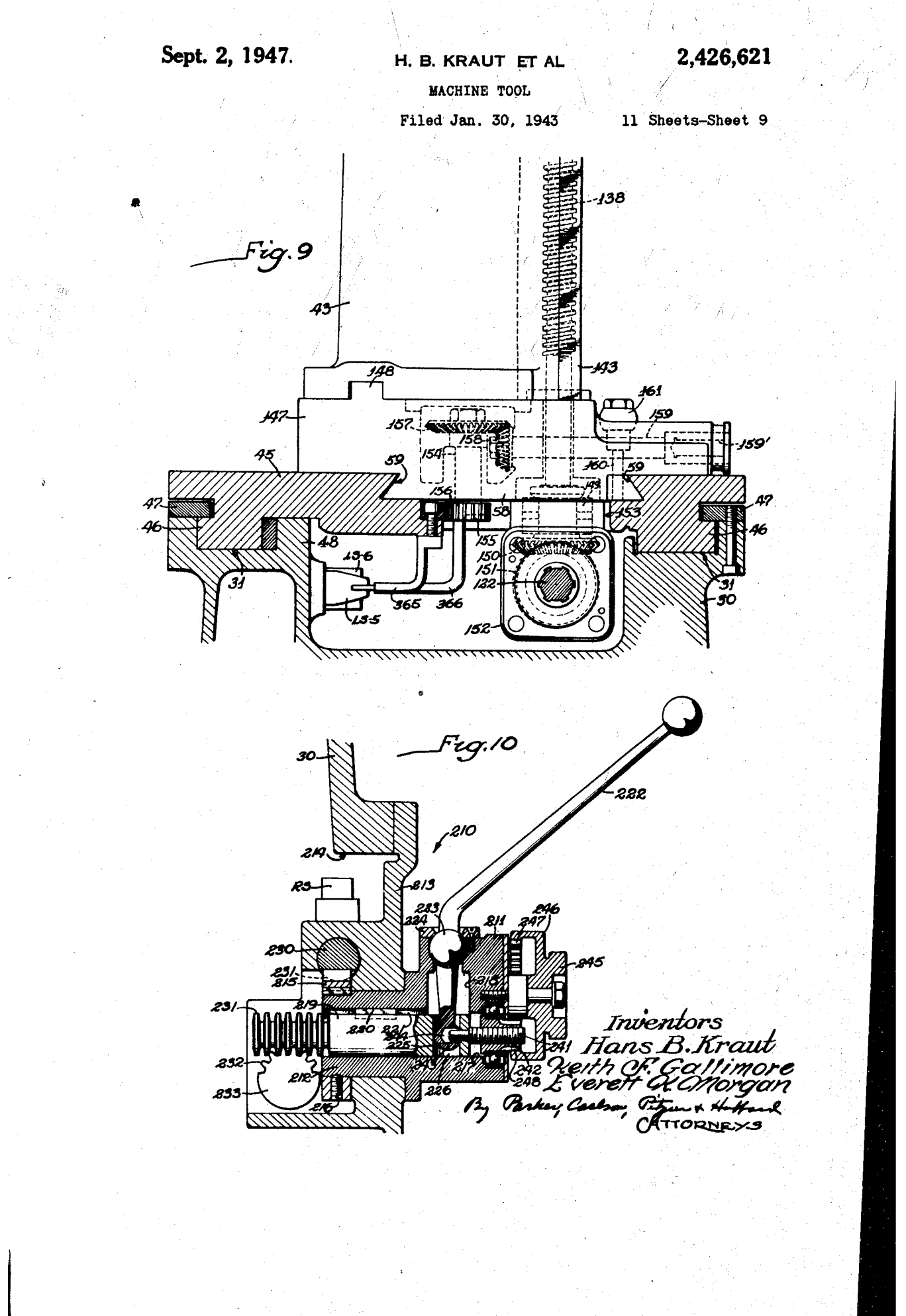

As shown in Fig. 9, the feed screw 138 is rotatably supported at its lower end in a bearing 149 carried on the column base 147 and has a bevel gear 150 keyed thereto for engagement with a bevel gear 151 splined on the shaft 122. The latter gear is rotatably anchored in a housing 152 secured to the underside of the column base and projecting through a longitudinal slot 153 in the platen 45. This slot provides clearance for the feed screw and associated mechanisms in various adjusted positions of the tailstock column on the platen.

As previously stated, the tailstock column is adjustably secured to the platen by the dovetail slide 58 engaging in the dovetail grooves or ways 59 in the face of the platen. The slide 58, in this instance, is formed on the lower face of the column base 147, as shown in Fig. 9. Any suitable means may be utilized for shifting the tailstock column along its ways. As herein shown, the adjusting means is enclosed within a chamber formed in the base 147 and includes a vertical shaft 154 having its lower end projecting below the slide 58. A pinion 155 fixed on the projecting end of the shaft meshes with a rack 156 extending along one side edge of the slot 153 and rigidly secured to the platen.

Fast on the upper end of the shaft 154 and disposed within the chamber in the base is a bevel gear 157 meshing with a bevel gear 158 keyed to the inner end of a horizontal shaft 159. The shaft is rotatably supported in the base with its outer end projecting at the front of the machine. A socket 159' in the projecting shaft end provides means for operatively connecting a hand crank thereto. Thus by simply turning the shaft 159 the tailstock may be shifted either toward or from the headstock column, as desired. Conventional clamping means including a clamping screw 160 arranged to be actuated by a hand lever 161 (Figs. 1 and 9) is operative to lock the tailstock column in any set position.

Platen and headstock feed

Reference has been made heretofore to the feed mechanism 50 and its adaptability for traversing the headstock 40 and tailstock 42 vertically on their respective columns and for translating the platen 45 horizontally on the ways 31. The use of a single feed mechanism for this purpose materially simplifies the machine structure and provides an exceedingly wide range of feed speeds for all of the movable machine elements without complicating the controls therefor. In general the feed mechanism is arranged to drive either the headstock and tailstock or the platen at a selectively variable rate in either a high speed range or a low speed range. Additional speed ranges may be obtained if desired by providing appropriate speed change gearing or equivalent speed control devices of conventional form. The speed ranges are selected manually at the beginning of an operation or at any other suitable time and ordinarily remain unchanged until the operation is completed. Within this range however, means is provided whereby the feed rate may be varied in incremental steps while the machine is in operation.

Figure 4:
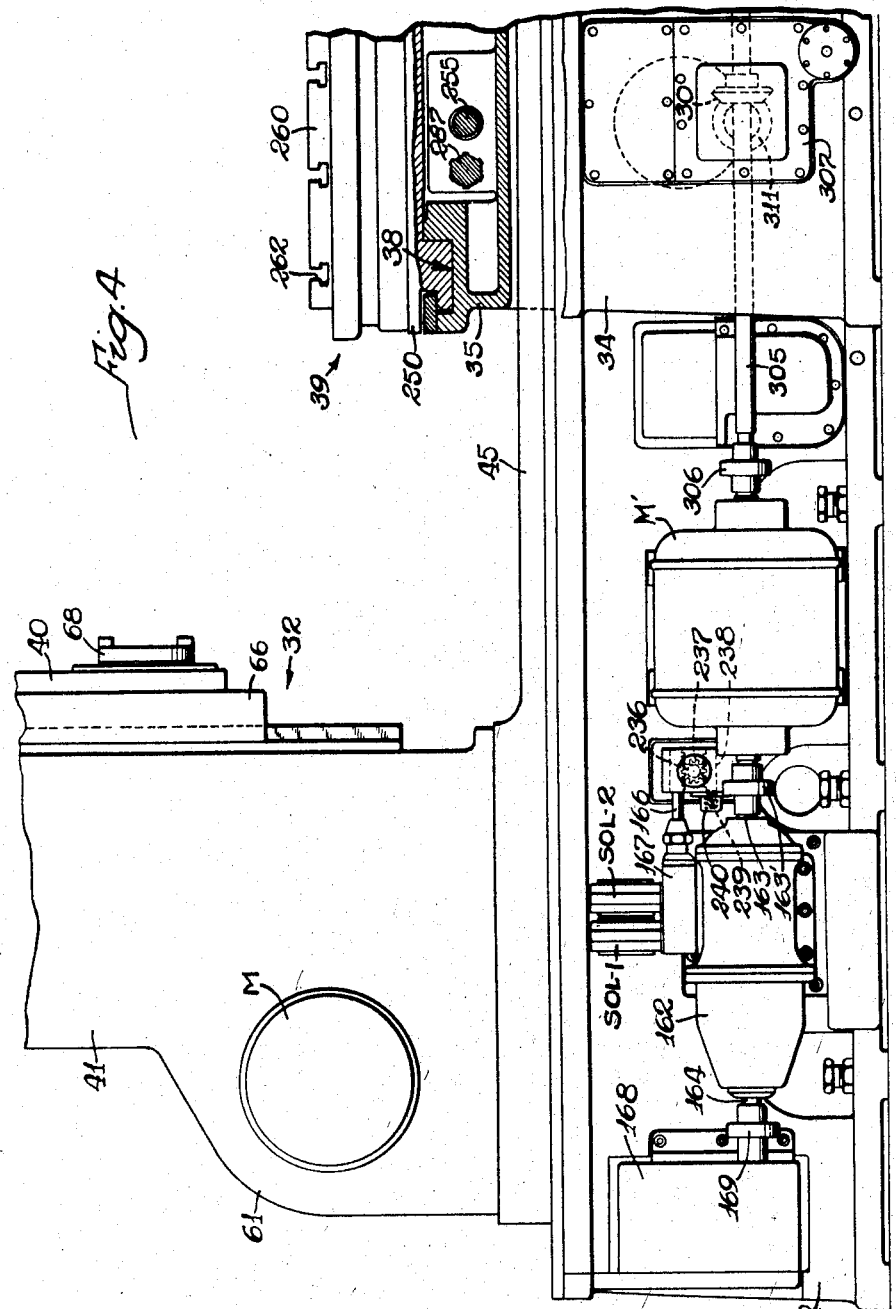
Fig. 4 is a fragmentary rear elevational view of the machine.
Figure 5:
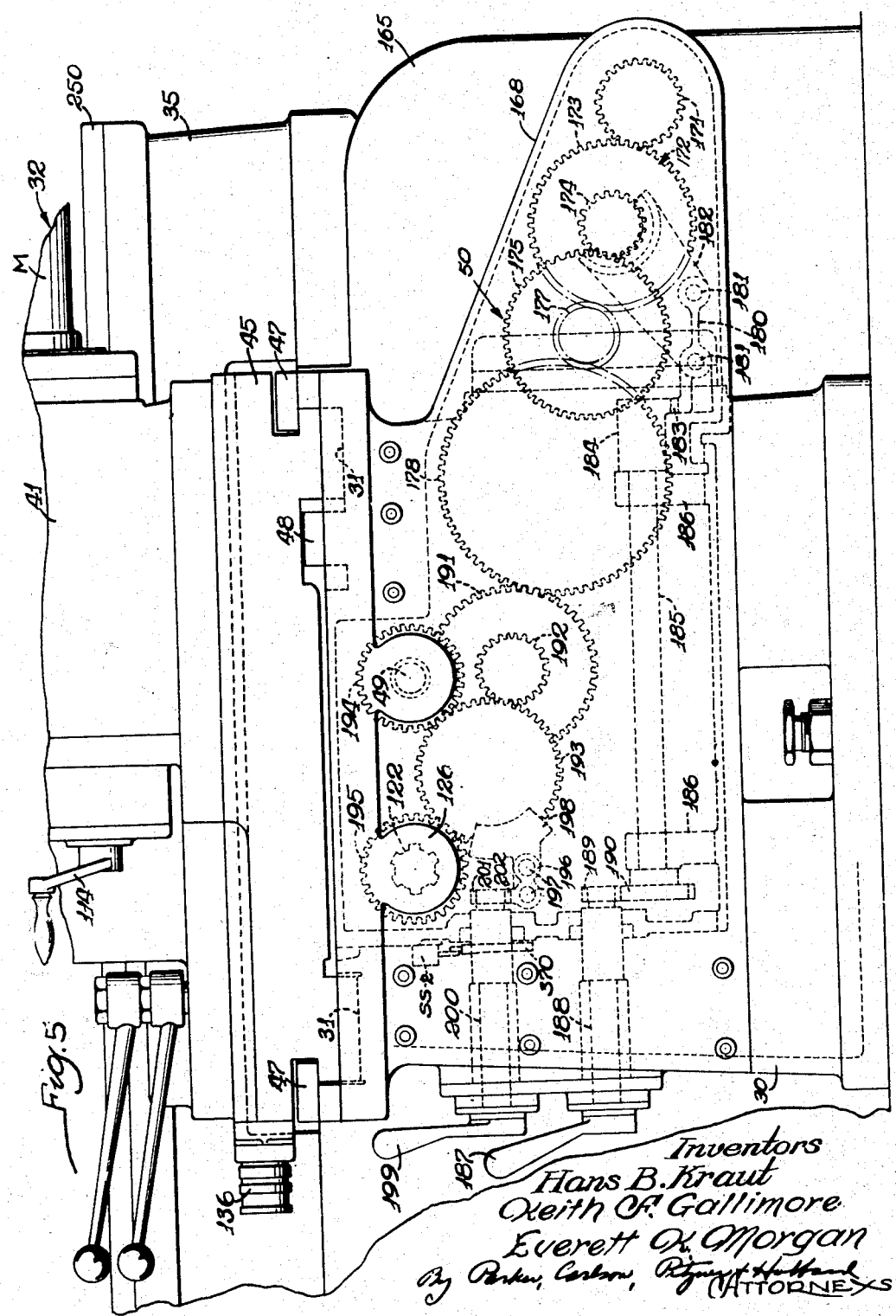
Fig. 5 is a fragmentary end elevational view of the machine showing a portion of the platen and headstock traversing mechanism and associated controls.

As shown in Figs. 4 and 12 the feed mechanism 50 in its preferred form comprises a variable speed reversible hydraulic transmission unit 162 of any well-known type having a power inlet or driven shaft 163 and an outlet or driving shaft 164. The inlet shaft is directly connected with the shaft of an electric motor M' as by a coupling 163' and is driven continuously thereby at a uniform speed. The motor and the hydraulic unit may be conveniently mounted on the back wall of the main bed 30 as shown in Fig. 4 and are conveniently enclosed in a ventilated housing 165 (Figs. 2, 3 and 5).

Both the speed and the direction of rotation of the outlet shaft 164 are adapted to be controlled in well-known manner. In the particular transmission unit shown herein the direction of rotation of the outlet shaft is controlled by a pair of solenoids SOL—1 and SOL—2 (Figs. 4 and 13) acting through suitable valves or the like (not shown). In this instance the arrangement is such that the outlet shaft is driven in one direction, for example clockwise when the solenoid SOL—1 is energized and in the reverse direction or counter-clockwise when both solenoids are energized. The speed of rotation of the outlet shaft is regulated by a shiftable plunger 166 operating through appropriate control mechanism enclosed in a casing 167 forming a part of the transmission unit.

Provision is made for selectively connecting the outlet shaft 164 of the transmission unit with either the platen feed screw 49 or with the drive shaft 122 and for either high speed or low speed operation. The means for effecting the speed range selection includes two-speed gearing and clutch devices enclosed in a housing 168 set in a recess in the head end of the main bed 30 as shown in Figs. 2-5. A coupler 169 of any suitable type drivingly connects the outlet shaft 164 with a shaft 170 journaled in the housing 168 and having on its inner end an elongated pinion 171 (Figs. 5 and 12). A cluster gear 172 arranged to slide longitudinally of the pinion 171 has a large gear element 173 in constant mesh with the pinion and a smaller gear element 174. The latter gear element is adapted to mesh with a gear 175 fast on a shaft 176 upon movement of the cluster gear to its low speed position. The shaft 176 has a small pinion 177 in constant mesh with a large diameter idler gear 178 and is adapted to be drivingly engaged with the gear element 173 when the cluster gear is shifted to the high speed position. Both gear elements of the cluster gear are disengaged and the drive interrupted when the cluster gear is set in central or neutral position in which it is shown in Fig. 12.

The means for shifting the cluster gear to select either driving range includes a shoe 180 (Fig. 5) slidably supported for movement axially of the cluster gear by spaced parallel guide bars 181 carried in the housing 168. A rigid arm 182 extending upwardly and rearwardly from the shoe is formed with a yoke adapted to receive the periphery of the gear element 174 and operative to carry the cluster gear along with the shoe in the movements of the latter on the guide bars.

Fashioned on the forward edge of the shoe 180 is an upwardly facing rack 183 engaged by a segmental pinion 184 keyed to a horizontal shaft 185. The shaft is journaled in suitable brackets 186 rigid with the bottom wall of the housing 168 and is arranged to extend transversely of the machine bed. For rocking the shaft 185 to selectively position the shoe 180 there is provided a hand lever 187 accessible at the front of the machine (as shown in Figs. 1, 3 and 5). The hand lever is fixed on the projecting end of a shaft 188 extending through the front wall of the bed 30 and the adjacent wall of the gear housing 168 suitably journaled therein. A pinion 189 keyed to the shaft within the gear housing meshes with a gear 190 keyed to the shaft 185 and provides a driving connection between the two shafts. The gear ratios are preferably such that the high speed range may be selected by rocking the lever 187 from an upright position through a relatively small angle to the left (as viewed in Fig. 1) while the low speed range may be selected by rocking the lever to the right through a similar angle. With the lever in upright or vertical position, the cluster gear is set in neutral position thus interrupting the drive.

Referring again to Figs. 5 and 12 the idler gear 178 is arranged to drive a gear 191 rigid with an elongated pinion 192. An axially slidable clutch gear 193 in constant mesh with this pinion is adapted to be shifted into meshing engagement selectively with a gear 194 fast on the end of the platen feed screw 49 or with a gear 195 fast on the headstock and tailstock traversing shaft 122. The clutch gear may also be set in a central or neutral position in which the drive is disengaged from both the screw and the shaft.

Any suitable means may be utilized for shifting the clutch gear 193 to establish the driving connections above referred to. As shown in Fig. 5, this means comprises a shoe 196 slidably supported on spaced parallel guide bars 197 and having a rigid arm 198 formed with a pocket adapted to receive the periphery of the gear 193. The shoe 196 is shifted along the guide bars by means of a hand lever 199 accessible at the front of the machine and preferably disposed closely adjacent the speed selecting lever 187. This hand lever is secured to the projecting end of a shaft 200 which extends through the front wall of the bed 30 and the adjacent wall of the gear housing 168. A pinion 201 on the inner end of the shaft 200 is arranged to engage a rack 202 on the rear edge of the shoe 196 to transmit the movements of the hand lever to the shoe.

With the arrangement above described the gear 193 may be engaged with the gear 194 to drive the feed screw 49 and thus feed the platen on its ways by rocking the hand lever 199 through a relatively small angle to the left of the upright position in which it is shown in Fig. 1. Alternatively, by rocking the lever to the right the gear 193 is engaged with the gear 195 so as to drive the shaft 122 and thus traverse the headstock and tailstock on their respective columns as previously described. The speed at which these movements are effected is determined by the setting of the speed range selector gears and by the adjustment of the hydraulic transmission unit 162. The direction of movement is determined by the setting of the hydraulic transmission unit for forward or reverse rotation of the outlet shaft.

*Speed and direction control*

The direction of movement of the movable elements of the work support including the headstock 40, tailstock 42 and platen 45 and the rate of such movements within either of two selected speed ranges is determined by the adjustment of the hydraulic variable speed transmission unit 162 forming a part of the feed mechanism. The invention provides manually actuated mechanisms of a novel and advantageous character by which such adjustments may be effected through the medium of a single control lever. The ease and accuracy of control thus provided materially simplifies the work of the machine attendant and substantially increases the productive capacity of the machine. In the case of machines of relatively large size, such as the exemplary machine, duplicate control levers are provided at two or more stations so that the attendant may control the machine with the greatest convenience.

Referring now to Figs. 1, 4 and 10 of the drawings, the speed and direction control mechanism, as herein shown, comprises a pair of control units 210 and 210' mounted on the front wall of the machine bed 30 at conveniently located stations preferably on opposite sides of the work support 39. It will be understood of course, that the two unit arrangement shown is merely illustrative and that one or in fact any number of such units may be provided according to the particular requirements of the machine involved. As these control units are of the same construction a description of one will suffice.

The control unit 210, as shown in Fig. 10, comprises a generally cylindrical housing 211 having an eccentrically located, rearwardly extending hub portion 212 rotatably supported in a panel 213 adapted to be bolted or otherwise removably secured over a flanged opening 214 in the front wall of the bed 30. The body of the housing 211 engages the front wall of the panel and a gear element 215 secured to the inner end of the hub 212 as by a set screw 216 engages the rear wall of the panel to hold the housing against axial movement while permitting it to rotate freely in the panel.

Extending through the housing 211 and the hub portion 212 is an axial bore 217 connecting with a transverse bore 218 in the body of the housing. A cylindrical plunger 219 is slidably supported in the first mentioned bore and is held against rotation therein by a key 220 engaging in a keyway 221 in the hub.

A single hand lever 222 is provided for reciprocating the plunger and for rocking the housing about the axis of the hub. As herein shown, the hand lever is formed with a rigid ball 223 intermediate its ends adapted to set in a suitable socket formed in the housing 211. The ball is retained in its socket by a retaining plate 224 fixed to the housing. The inner end of the hand lever extends into the bore 217 and is provided with an enlarged head 225 engaging in a slot 226 in the plunger 219. Preferably the hole 226 is dimensioned to receive the head 225 with a sliding fit so that the plunger may be shifted axially by rocking the hand lever toward or from the machine bed on the axis of the ball 223. This slot, however, prevents the rocking of the hand lever about the ball 226 in any other plane. Accordingly, the entire housing responds when the lever is rocked in a plane parallel to the longitudinal axis of the machine bed.

The rotative movements of the housing are utilized in this instance for controlling the direction of rotation of the outlet shaft of the transmission unit 162 and thereby control the direction of movement of the platen or the headstock and tailstock. As herein shown, the control is effected through the medium of electrical switches including a forward switch FS and a reverse switch RS connected in the circuit with the solenoids SOL—1 and SOL—2 as shown in Fig. 13 and described in detail hereinafter. These switches may be of any suitable and well-known construction and are mounted on a rearwardly projecting flange of the panel 213 on opposite sides of the housing 211. For actuating the switches there is provided a cam bar 230 (Figs. 1 and 10) slidably supported for endwise movement in the panel flange below the switches RS and FS. Rack teeth 231 formed on one side of the bar engage with the teeth of the gear element 215 which, as previously stated, is fixed to the hub of the housing 211. Thus rocking of the housing is effective to shift the cam bar axially.

The cam bar 230 is formed with notches similar to those of the cam bar shown in Fig. 11 to provide spaced cam surfaces positioned for coaction respectively with forward and reverse switches. The arrangement of the cam surfaces is such that movement of the bar in one direction is effective to close the forward feed switch FS while movement of the bar in the opposite direction closes both switches. Closure of the switches in the above manner energizes the solenoids SOL—1 and SOL—2 selectively to set the transmission unit 162 for driving the machine elements in the desired direction.

Movements of the hand lever 222 toward and from the machine bed are utilized for adjusting the transmission unit to regulate the speed at which the machine elements are moved. To this end the plunger 219 associated with the transmission is formed on its inner end with rack teeth 231 engaging gear teeth 232 on a shaft 233 extending longitudinally of the machine bed. This shaft is suitably journaled in bearings carried by the panel 213 and carries a bevel gear 234 (Fig. 1) meshing with a bevel gear 235 fast on the end of the horizontal shaft 236. The shaft 236 extends transversely of the machine bed and is provided with a pinion 237 (Fig. 4) meshing with rack teeth formed on the speed adjusting plunger 166 of the transmission unit. Thus by rocking the shaft 236, the speed adjusting plunger may be shifted in either direction as required to increase or decrease the speed of the outlet shaft 164 of the unit.

Means is provided for yieldably urging the adjusting mechanism in a direction to decrease the feed rate so that the movable elements will be slowed down automatically when the speed control hand lever 222 is released. For this purpose a rack member 238 is supported for engagement with the pinion 237 in opposed relation to the plunger 166. A spring 239 enclosed in a housing 240 urges the rack member to the right (as viewed in Fig. 4) thus yieldably biasing the speed control plunger 166 and the associated control mechanism toward a stop position.

In order to prevent the drive from being entirely stopped when the hand lever is released, means is provided for limiting the extent to which the control member can be returned by the action of the spring 239. As herein shown, the means provided for this purpose comprises a movable abutment in the form of a stop screw 241 (Fig. 10) positioned for co-action with the plunger 219. The stop screw is threaded into a nut 242 rotatably supported in anti-friction bearings at the outer end of the bore 217 in the housing 211 and is held against rotation by having its inner end 243 squared and slidably entered in a complementary socket in the adjacent end of the plunger 219. The squared end portion of the screw is of sufficient length to maintain engagement in the socket in all positions of the plunger and screw and the head 225 has an opening 244 to receive the extended end 243 when the parts are brought together as shown in the drawing. Since the screw is non-rotatable it is apparent that rotation of the nut 242 will be effective to shift it axially and thus determine the limit position of the plunger 219.

Suitable means is provided for rotating the nut 242 to set the stop screw in position to establish a desired feed rate. In the preferred form shown, this means comprises a knob 245 rotatably supported on the front end of the housing 211. The knob is formed with a flange or skirt portion 246 adapted to extend over the outer end of the nut, the skirt having internal gear teeth 247 meshing with external gear teeth 248 formed on the nut. Thus, by rotating the knob 245, the stop screw 241 may be shifted in or out as required for any operation. The knob may be suitably calibrated, of course, to indicate the setting of the stop screw.

In order to render both control units 210 and 210' effective for controlling the operation of the machine, the cam bar 230 and shaft 233 are extended longitudinally of the machine bed and are operatively connected with the unit 210' in the same manner as with the unit 210 just described. Thus, the switches FS and RS and the speed control plunger 166 may be actuated by the hand lever 222' in exactly the same manner as by the hand lever 222.

Various features of the speed and direction controls per se are disclosed and claimed in copending application of Everett K. Morgan, Serial No. 704,068, filed October 18, 1946.

Work supporting structure

As explained heretofore, work to be operated on is carried on the work support 39 which is mounted on the bridging member 35 for movement transversely of the machine bed or perpendicular to the rotational axis of the tool spindle. Such movements are utilized primarily in positioning the work so as to locate a selected area for the action of the tool. It will be appreciated, however, that the transverse movement of the support may be employed in feeding the work relative to the tool in certain operations such as milling. The invention further provides means by which the supported workpiece may be rotated about a vertical axis. The rotative movements are likewise utilized in positioning the work although if desired, such movement may be employed for effecting a relative feed between the work and tool in a turning operation.

In the preferred form herein shown, the work support 39 comprises a generally rectangular slide 250 (Figs. 1, 2, 7 and 8) having parallel depending guide flanges 251 for engagement with the ways 38 on the bridging member 35. Horizontal gib plates 252 secured to the bridging member and engaging in grooves on opposite sides of the slide act to hold the same securely on the ways. A vertical gib plate 253 may be provided between one of the guide flanges 251 and an adjacent shoulder presented by an upstanding flange 254 on the bridging member to take up any lateral play between the slide and the ways.

Provision is made for traversing the slide on the ways at selectively variable speeds in either direction. The traverse movements are imparted to the slide, in this instance by a feed screw 255 (Figs. 2, 7 and 12) coacting with a fixed nut 256 on the slide. The feed screw is arranged horizontally in a compartment formed in the bridging member below the ways 38 and is rotatably anchored at one end in a bearing 257 on the rear wall of the bridging member. The other end of the feed screw extends into a gear housing 258 (Figs. 7 and 8) rigidly mounted at the front of the bridging member and enclosing driving mechanism to be described hereinafter for rotating the feed screw. A suitable bearing supports the forward end of the feed screw on the rear wall of the housing 258.

While the work to be operated on may be supported directly on the slide 250, it is preferred to provide an auxiliary table 260 for this purpose. In the exemplary machine the table is supported on the slide for rotation by a vertical axis although other types of mountings may be employed if desired. The table 260, as herein shown, comprises a flat generally rectangular top section having longitudinally extending stiffening ribs 261 on its underside and T-slots 262 in its upper face for reception of conventional work clamping devices. Integral with or rigidly secured to the top section is a base section 263 also of generally rectangular form but of slightly greater dimensions than the top section. An upstanding flange 264 around the periphery of the bottom section 263 and spaced from the edge of the top section defines a trough around the top of the table.

As shown in Fig. 8, the table structure is mounted on a vertically disposed spindle 265 anchored in an upstanding boss 266 substantially at the center of the slide 250. The base section 263 of the table is formed with a circular opening concentric with the spindle while the top section has a depending hub 267 axially alined with this opening. The hub is formed with a cylindrical bore dimensioned to receive the upper end of the spindle and with a counterbore adapted to seat thrust bearings 268 for cooperation with the spindle. The counterbore may be closed at the top by a plug 269 having its upper surface flush with the face of the table.

The table structure is supported at its periphery by a roller bearing of large diameter to reduce friction and thus permit easy movement of the table. The bearing, as herein shown, comprises a hardened wear ring 270 suitably anchored to the slide 250 and forming a track for a series of balls 271. A similar wear ring 272 attached to the underside of the table base 263 is adapted to rest on the balls 271 and thus support the weight of the table.

Means is provided for clamping the table in any selected angular position when the work is to be held stationary during a machining operation. For this purpose the upper face of the slide 250 and the adjacent faces of the table base 263 are formed with axially alined annular flanges 273 and 274 encircling wear rings 270 and 272 respectively. The flanges project into closely abutting relation and are oppositely beveled on their outer surface for engagement in a V-shaped groove formed in the inner face of an annular clamping member 275.

The clamping member is preferably constructed in two parts or semi-circular sections pivotally connected together at the rear of the slide and anchored thereto as by a pin 276. The opposite ends of the sections are adjustably connected by a clamping screw 277 rotatably anchored in a boss 278 on one section and threaded into a similar boss 279 on the other section. The section of the screw exposed between the two bosses is protected from chips or other foreign material by a shield 280 of sheet metal or other suitable material.

The outer end of the clamping screw is extended to the side of the table wall for convenient access and the end portion may be squared or otherwise formed for engagement by a wrench or similar tool. By turning the screw, the sections of the clamping ring may be drawn together into tight engagement with the beveled surfaces of the flange 273 and 274 so as to prevent rotation of the table. Moreover, the clamping ring exerts a wedging action on the flanges tending to force their adjacent surfaces into frictional engagement and thus reenforce the first mentioned clamping action. In this way a very powerful clamping effect is obtained which precludes any movement of the table during a machining operation. When the table is to be rotated, the clamping ring is released by turning the clamping screw in a direction to separate the ring sections.

Rotation of the table 260 may be effected in any suitable manner. In the particular machine illustrated the means provided for this purpose comprises an internal ring gear 282 (Figs. 8 and 12) bolted or otherwise rigidly secured to the table base 263 inside the bearing ring 272 and concentric with the spindle 265. Meshing with the gear 282 is a pinion 283 fast on the upper end of a vertical shaft 284 rotatably supported on the slide 250. A worm wheel 285 fast on the lower end of the shaft is arranged to be driven by a worm 286 splined to a horizontal drive shaft 287 extending longitudinally of the bridging member 35 below the ways 36. The worm wheel 285 and worm 286 are rotatably supported in a housing 288 secured to the underside of the table slide 250 so that the worm is free to slide along the drive shaft and maintain the driving connection with the table in all positions of the slide.

As shown in Figs. 2 and 8, the drive shaft 287 is rotatably supported at its rear end in a bracket 289 carried on the bridging member 35. The forward end of the shaft projects into the gear housing 258 and is supported on the rear wall of the housing by a suitable bearing 290. Driving mechanism within the housing is adapted to be connected to the shaft 287 or alternatively with the feed screw 255 as will now be described.

Table drive mechanism

The invention provides a variable speed drive mechanism common to the work support slide 250 and the rotary table 260 and selectively engageable to traverse the slide on its guideway or to rotate the table. This mechanism, while entirely separate from and independent of the platen drive mechanism, is arranged to be driven by the same motor. In this way the cost of the machine is substantially reduced without sacrifice of efficiency or flexibility as the independent feed mechanisms provide a complete range of feed and rapid traverse speeds for each of the machine elements.

Figure 7:
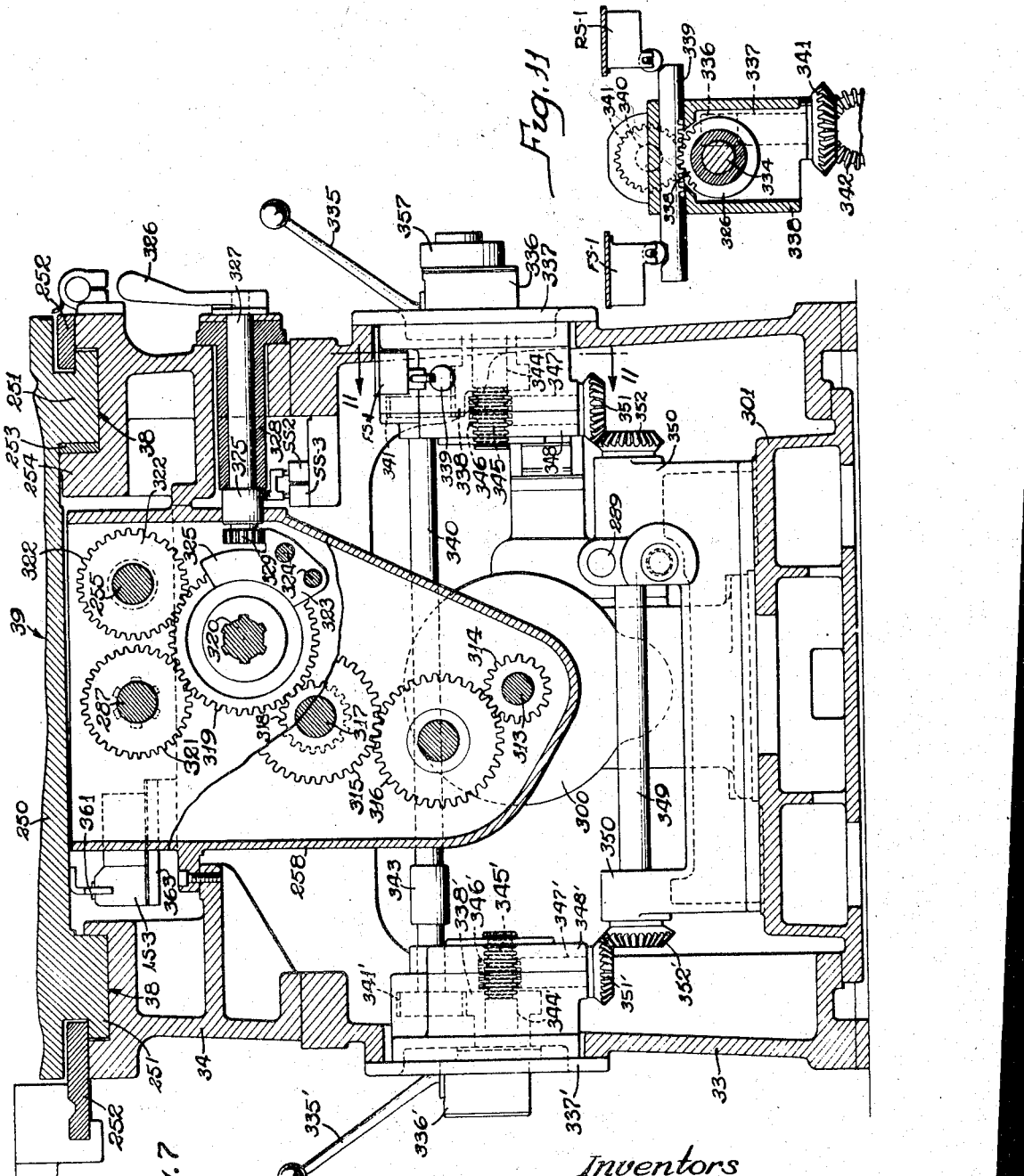
Fig. 7 is a fragmentary sectional view taken along the line 7—7 of Fig. 2 showing the arrangement of the work support feed mechanism and associated controls.
Figure 8:
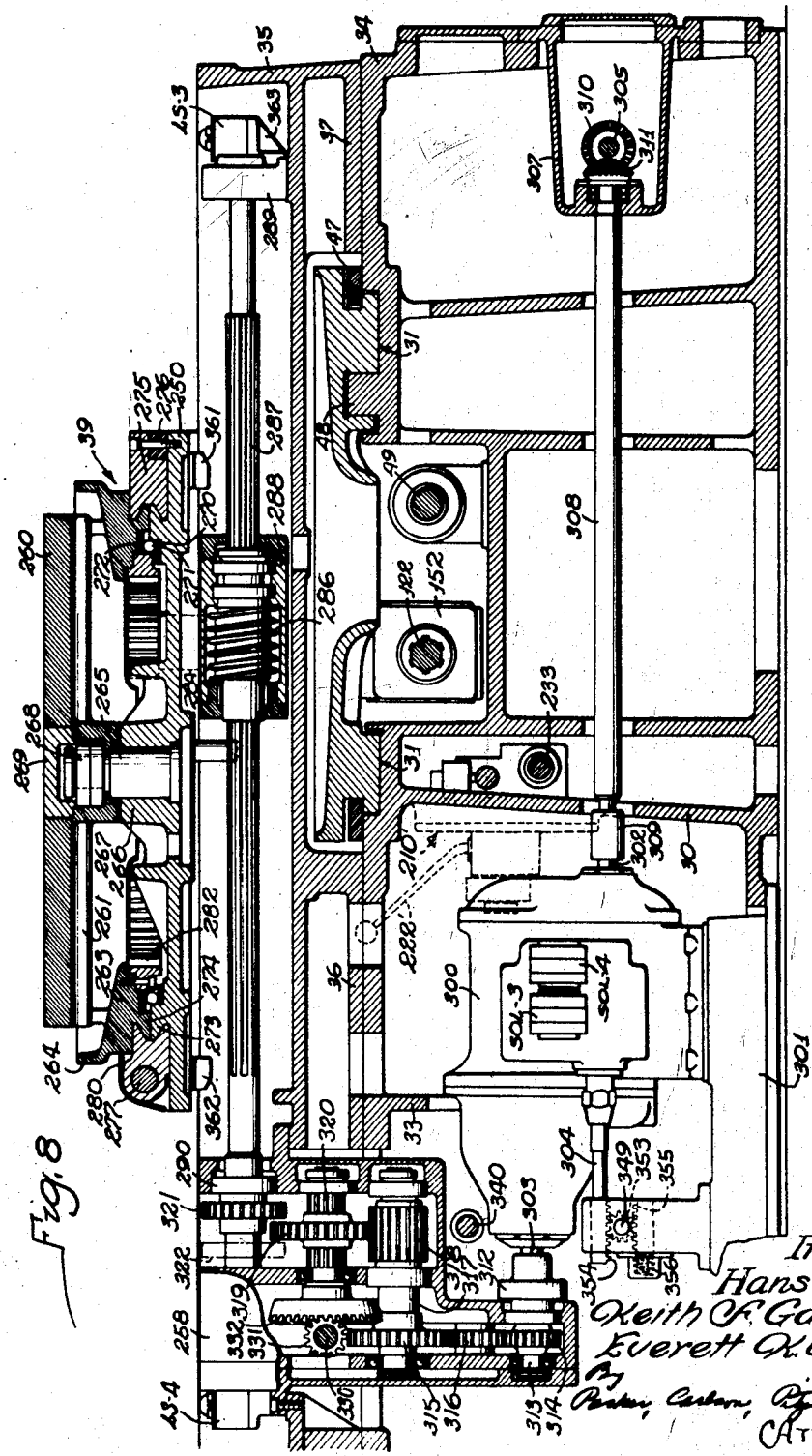
Fig. 8 is a transverse sectional view through the machine bed, bridge and work support taken in a vertical plane substantially along the line 8—8 of Fig. 2.

Referring more particularly to Figs. 7, 8 and 12 of the drawings, the work support driving mechanism in its preferred form includes a reversible variable speed hydraulic transmission unit 300 of any suitable and well-known type preferably similar to the transmission unit 162. The transmission unit 300 may be mounted on a suitable base 301 secured to the auxiliary bed member 33 at the front of the main bed. The unit has the usual inlet or driven shaft 302 adapted to be driven continuously at a uniform speed, and an outlet or driving shaft 303 adapted to turn at any selected rate within the capacity of the unit. In the particular unit shown the rotational speed of the outlet shaft is regulated by control mechanism of well-known construction actuated by means of a plunger 304 (Fig. 8). Solenoids SOL—3 and SOL—4 control the direction of rotation of the outlet shaft in well-known manner. Thus, when the solenoid SOL—3 is energized, the shaft is rotated in one direction while energization of both solenoids causes the outlet shaft to be rotated in the reverse direction.

As herein shown, the transmission unit 300 is arranged to be driven by the motor M' which, as previously described, also drives the transmission unit 162. The driving connection between the motor and the unit includes a shaft 305 (Figs. 4 and 12) coupled at one end to the motor shaft by a coupling member 306. The shaft extends longitudinally of the main bed 30 and into the rear bed member 34 in which it is rotatably supported in a bearing carried by a housing 307 removably secured to the rear wall of the bed member as shown in Fig. 8. A cross shaft 308 extends forwardly from the housing to the transmission unit and is drivingly connected with the inlet shaft 302 by a coupling member 309. Within the housing 307, the bevel gears 310 and 311 keyed respectively to the shafts 305 and 308 drivingly connect the same.

Suitable mechanism is provided within the gear housing 258 for selectively connecting the outlet shaft 303 of the transmission unit with either the table slide feed screw 255 or the table drive shaft 287. To this end the outlet shaft is connected by a coupling 312 with a shaft 313 journaled in the housing 258. A pinion 314 fast on the shaft 313 is arranged to drive a gear 315 through an idler gear 316. The gear 315 is keyed to a shaft 317 which has a rigid elongated pinion 318. A clutch gear 319 splined on a shaft 320 for sliding movement parallel to the pinion shaft is continuously in mesh with the pinion.

The clutch gear 319 is adapted to be shifted from neutral position in which it is shown in Fig. 8 into alternate position effective to drive either the feed screw 255 or the shaft 287. When shifted to the right (as viewed in Fig. 8), the clutch gear meshes with a gear 321 fast on the table drive shaft 287 thus rendering the transmission unit effective to drive the rotary work table 260. When shifted to the alternate position, that is to the left (as viewed in Fig. 8) the clutch gear engages a gear 322 fast on the feed screw 255 and the transmission unit is thereby coupled to the table slide feed screw 255. In the central or neutral position of the clutch gear, the drive is disengaged from both the shaft and the feed screw.

For shifting the clutch gear 319 there is provided a shifter fork 323 (Fig. 7) slidably supported at one side of the shaft 320 on the parallel spaced guide rods 324 carried in the housing 258. The shifter fork is formed with a laterally projecting shoe 325 having a pocket or groove dimensioned to receive the peripheral edge of the clutch gear and operative to slide the gear along its shaft in response to corresponding movements of the fork.

While any suitable means may be utilized for shifting the fork between the three positions above mentioned, the exemplary machine is equipped with a hand lever 326 for this purpose. As shown in Fig. 7, the hand lever is fixed on the projecting end of a horizontal shaft 327 journaled in a bushing 328 carried on the side wall of the auxiliary bed member 34. The shaft extends into the gear housing 258 and has on its inner end a pinion 329 meshing with an upwardly facing rack formed along one side of the shifter fork. The pinion is dimensioned so that the fork may be shifted to either of the two driving positions by rocking the hand lever through a relatively small angle at either side of the vertical or neutral position.

In addition to the power drive means for traversing the slide 250 and for rotating the table 260, manually operable means is usually provided for moving these elements to facilitate initial setup of the machine for operation. The manually operable means, as herein shown, comprises a shaft 330 (Figs. 3 and 8) projecting from opposite sides of the auxiliary bed 34 and provided on its outer ends with suitable clutch teeth or the like for engagement with a hand crank. The shaft 330 extends through the gear housing 258 and is provided intermediate its ends with a pinion 331 meshing with a crown gear 332 keyed to the shaft 320 on which the clutch gear 319 is mounted. Thus the shaft and clutch gear may be rotated manually when desired and the gear, of course, may be engaged selectively to drive either the feed screw 255 or the shaft 287 as before explained. Tubular guards 333 and 333' (Figs. 1 and 3) are provided for projecting ends of the shaft 330 to prevent accidental contact therewith when the power drive is engaged. The guards are open at their outer ends to admit the hand cranks when used.

Table speed and direction control

Control mechanism is provided whereby the attendant may regulate the speed and control the direction of movement of the slide 250 or the table 260 by means of a single hand lever 335. This mechanism is similar in general to the platen drive control mechanism hereinbefore described and, as in the previous instance, is duplicated at two different stations for the convenience of the attendant. As herein show the stations are located on opposite sides of the work support and corresponding parts are designated by the same reference character with those of the auxiliary or duplicate control being further identified by a prime number.

Referring to Figs. 7 and 11, a hand lever 335 is pivoted intermediate its ends in a rockable housing 336 journaled in a panel 337 removably mounted on the side wall of the bed member 34. By swinging the hand lever in a plane substantially parallel to the path of the table slide, rocking movements are imparted to the housing which acts through a gear segment 338 to shift a cam bar 339. The bar is formed with cam surfaces positioned for cooperation with a pair of control switches FS—I and RS—I, the arrangement being such that the switch FS—I alone is closed upon movement of the cam bar to the left (as viewed in Fig. 11) while both switches are closed upon movement of the bar to the right.

Closure of the switch FS—I completes a circuit for energizing the solenoid SOL—3 to condition the transmission unit 300 for driving the table slide in a forward direction or for rotating the table counterclockwise. Simultaneous closure of both switch FS—I and switch RS—I completes a circuit for energizing the solenoids SOL—3 and SOL—4 to condition the transmission unit for driving the table slide rearwardly or for rotating the table counterclockwise. In the central or neutral position of the cam bar, both switches are opened and the transmission is set in neutral position so that the outlet shaft remains stationary.

To facilitate control of the machine operation, the duplicate control device previously referred to is provided on the opposite side of the work support. This control device is similar in all respects to the companion control device except that the cam bar and associated control switches are omitted. Instead, provision is made for transmitting the movement of the housing 336' to the housing 336 whereby the cam bar and control switches may be actuated under control of either hand lever 335 or 335'. To this end a shaft 340 extending across the bed 34 is provided at one end with a pinion 341 meshing with the gear teeth 338 on the hub portion of the housing 326, the gear teeth being extended rearwardly for this purpose. At its other end the shaft is provided with a pinion 341' meshing with gear teeth 338' formed on the hub portion of the housing 336'. To facilitate removal and adjustment of the control apparatus, the shaft 340 is conveniently formed in two sections operatively connected by a splined coupling 343.

As in the case of the platen controls, the table control hand levers 335 and 335' are also utilized for regulating the feed rate of the table slide or table. For this purpose the hand levers are arranged respectively to shift plungers 344 and 344' axially within the housings 336 and 336'. These plungers are identical in form, each being provided with peripheral rack teeth 345 and 345' meshing with gear teeth 346 and 346' formed on vertical shafts 347 and 347'. These shafts are journaled in extensions 348 and 348' of the panels 337 and 337' and are connected for simultaneous movement by a cross shaft 349 journaled in brackets 350 carried on the transmission unit base 301. To this end vertical shafts are provided respectively with bevel gears 351 and 351' meshing with bevel gears 352 and 352' keyed to opposite ends of the cross shaft.

As shown in Fig. 8 a pinion 353 keyed to the shaft 349 within a housing formed in one of the brackets 350 meshes with rack teeth 354 formed in the projecting end of the speed regulating plunger 304 of the transmission unit 300.

Also cooperating with the pinion 353 is a rack 355 urged by a spring 356 in a direction to shift the plunger 304 toward the stopping position. The action of the spring 356 is transmitted through the various shafts and gearing to the plungers 344 and 344' and their respective hand levers, thus yieldably urging these parts toward a stop position. The extent of this movement may be regulated in the same manner as in the control unit 210 previously described, that is by an adjustable stop coacting with the plunger 344. This stop is adapted to be set in a preselected position by means of a rotatable knob 357 (Figs. 1 and 3) acting through mechanism similar in all respects to that shown in Fig. 10. The setting of the stop does not prevent shifting of the control lever to rapid traverse position but determines the feed rate to which the drive mechanism will automatically return when the hand lever is released.

Limit controls

Safety stop means is provided in connection with the various linearly translatable machine elements to arrest the power drive when the elements have reached the limits of their travel in either direction. This means comprises suitable limit switches and, in the case of the headstock 40 and table slide 250, simple switch actuators secured to and movable with the respective elements. Thus the headstock is provided with an actuator in the form of a cam plate or dog 360 (Figs. 3 and 6) adapted to coact alternately with an upper limit switch LS—I and a lower limit switch LS—2. These switches are incorporated in the control circuit as shown in Fig. 13 so as to interrupt the drive for the headstock when either the upper or the lower limit of travel is reached.

A similar limit control arrangement is provided for the table slide 250. Due to the length of this slide it has been found convenient to provide two cam plates or dogs 361 and 362 (Figs. 7 and 8) for actuating limit switches LS—3 and LS—4 respectively. The dog 361 is secured to the underside of the table adjacent its rear end and is positioned to coact with the switch LS—3 which is stationarily supported on a bracket 363 carried on the bridging member which supports the slide. The dog 362 is mounted at the front end of the slide to coact with the limit switch LS—4 which is suitably supported on the front portion of the bridging member. These limit switches are incorporated in the control circuit as shown in Fig. 13 and described hereinafter.

The arrangement of the limit switches for the platen presents a more difficult problem because of the adjustable mounting of the tailstock column thereon. Thus, in order to prevent the tailstock column from being jammed against the work support, the travel of the platen must be confined within limits which vary according to the position of the column on the platen.

To insure safe operation under all working conditions, one switch actuator or dog 365 (Fig. 9) is rigidly attached directly to the platen while a second switch actuator or dog 366 is secured to the column base 147 for movement therewith relative to the platen. The fixed actuator 365 is arranged to cooperate with a limit switch LS—5 to interrupt the feed of the platen as the latter approaches the limit of its travel to the left (as viewed in Fig. 1). The adjustable actuator 366 coacts with a limit switch LS—6 to interrupt the feed of the platen to the right, thereby stopping the same before the tailstock column is jammed against the work support irrespective of the position of the tailstock column on the platen.

*Electrical circuits*

The control of all operations of the machine except speed regulation is effected through the medium of electrical control circuits in which the direction control and limit switches heretofore described are incorporated. In addition to these primary control switches which are utilized when the machine is running to control the starting, stopping and direction of movement of the various machine elements, the circuits include a group of secondary control switches adapted to be actuated to start and stop the machine. The secondary switches and associated electrical elements of the circuits may be assembled on a suitable control board or panel mounted on the machine bed at any convenient location.

Referring to Fig. 13 of the drawings the machine is connected to a suitable source of electric power by a power line comprising conductors L—1, L—2 and L—3 and current is supplied to the motors M and M' at full line voltage. Suitable overload release devices are provided in the motor circuits but as these are old and well-known they have been omitted from the drawings. The control circuits are preferably operated at a reduced voltage and for this purpose are connected to the power line through a step-down transformer TR. As a safety measure, the starting circuits for the motors are interlocked so that the spindle driving motor can be started only when the feed motor is running. During operation of the machine both motors run continuously.

The feed motor is adapted to be started by momentary closure of a normally open starting switch ST—1 which completes an energizing circuit for a running relay RR—1. The running relay, in turn, completes a holding circuit for itself independent of the starting switch by closing a holding switch RR—11. The relay also closes a switch RR—12 to connect the feed motor M' to the power line. The motor may be stopped at any time by opening a normally closed stop switch SS—1 in series with the switch RR—11 in the holding circuit.

With relay RR—1 energized, the spindle driving motor M may be started by momentary closure of a starting switch ST—2. The direction of rotation of the motor shaft is determined by the setting of a two position manually operable direction selecting switch having alternately opened and closed switch contacts DS—1 and DS—2. Switch contacts DS—1, when closed, prepare a circuit for a control relay CR—1 while switch contacts DS—2, when closed, prepare a circuit for a control relay CR—2. One or the other of these relays is therefore energized upon closure of the starting switch. Relay CR1, when energized, closes a switch CR—11 to connect motor M to the power line in a manner such as to cause the motor to run in one direction, for example, clockwise. Relay CR—1 also closes a switch CR—12 to complete a circuit for a running relay RR—2 and opens a switch CR—12 to prevent the establishment of a circuit for the companion control relay CR—2.

Relay CR—2, when energized, connects the motor M to the power line by closing a switch CR—21. This connection is such that the motor runs in the reverse direction or counterclockwise. Relay CR—2 also completes a circuit for the running relay RR—2 by closing a switch CR—22 and the companion control CR—1 is locked out by the opening of a switch CR—23.

The running relay RR—2 is energized each time the motor M is started irrespective of which of the control relays is utilized to effect the starting. A plugging relay PR—1 is also energized, and these two relays, by closing switches RR—21 and PR—11 respectively, complete a holding circuit for themselves and for the selected control relay whereby the motor circuit is maintained after the starting switch is released. The running relay by closing switch RR—22 prepares the control circuits of the hydraulic transmission unit for operation as will appear presently.

The plugging relay PR—1, in addition to cooperating with the running relay in establishing the holding circuit above described, also closes a switch PR—12 to shunt resistances R, one of which is connected in each line conductor leading to the motor M. The function of these resistances is to reduce current flow to the motor during a reverse current or plugging interval which is initiated automatically each time the motor is stopped. The reduced voltage plugging prevents too sudden stopping of the motor and thus protects the machine from excessive shock loads. When the motor is started and during the running period, the resistances are rendered ineffective due to the shunt provided by the switch PR—12.

The reversal or plugging of the motor M to a quick stop is controlled by a plugging switch which may be of any preferred type adapted for use with motors adapted to run in either direction. The plugging switch is associated with the drive shaft of the motor and is provided with two sets of contacts PS—1 and PS—2. Switch contacts PS—1 are closed when the motor shaft is turning in a clockwise direction and switch contacts PS—2 are closed when the motor shaft is turning in a clockwise direction and switch contacts PS—2 are closed when the motor shaft is turning in reverse direction. The closed switch opens substantially instantly when the motor shaft stops.

The plugging switches are connected in the circuit with the control relays CR—1 and CR—2 in a manner such that the closed switch prepares a circuit for energizing the control relay required to reverse the direction of rotation of the motor. More specifically, the plugging switch PS—1 which is closed when the control relay CR—1 is energized and the motor in running in a clockwise direction, is adapted to prepare a circuit for the companion control relay CR—2. As long as the running circuit remains closed, circuit for relay CR—2 is incomplete due to the open condition of the switch CR—13. Alternately, when control relay CR—2 is energized and the motor is running in a counterclockwise direction, plugging switch PS—2 is closed and prepares a circuit for control relay CR—1. This circuit is open, however, at switch CR—23.

It will be noted that the circuits prepared for the control relays by way of the plugging switches are independent of the stop switch SS—1. Accordingly, when the stop switch is opened, the control relay energized during the running period of the motor is released, and the companion control relay is energized to reverse the connections of the motor to the power line. Plugging relay PR—1 is also released by the opening of the stop switch and removes the shunt from the resistances R to connect these resistances in series with the motor. The current reversal brings the motor to a quick stop and, substantially at the instance of such stopping, the plugging switch opens to prevent further operation of the motor.

In setting up the machine it may be desirable at times to rotate the spindle in relatively small accurately controlled spaces. Such rotation, commonly known as "inching," is obtained by actuation of an inching switch IS—1. This switch performs exactly the same functions as the starting switch ST—2 above described and additionally opens a point in the holding circuit normally completed by the relays RR—2 and PR—1. The motor M therefore runs only while the inching switch is held in closed position and stops immediately upon release of the switch. This enables the machine attendant to turn the tool spindle quickly and accurately to any desired angular position.

By reason of the interlock provided by the switch RR—22, the controls for the hydraulic transmission units 162 and 300 are operative only when both the spindle driving motor M and the feed motor M' are running. As previously described, control of the unit 162 is effected through the medium of solenoids SOL—1 and SOL—2, the unit running in one direction when the first solenoid is energized and in the reverse direction when both solenoids are energized. Solenoid SOL—1 is connected in series with the forward starting switch FS, the upper and lower limit switches LS—1 and LS—2 of the headstock and the left and right limit switches LS—5 and LS—6 of the platen.

As the headstock and platen are never driven simultaneously by the transmission unit, only one set of limit switches is required to function at any given time. Means is therefore provided for establishing a shunt around the unused set of limit switches to avoid any possibility of interference with the normal operation of the controls through inadvertent actuation of a switch. This means as herein shown, includes a shunt switch SS—2 operative when closed to complete a shunt or bypass circuit around the switches LS—1 and LS—2 and a second switch SS—3 operative when closed to establish a similar bypass circuit around the switches LS—5 and LS—6. The shunt switches may be actuated in any preferred manner, as for example, by an actuator 370 (Fig. 5) such as a cam or the like mounted on the shaft 200. This shaft, as previously explained, is adapted to be rocked by a hand lever 199 to couple the transmission unit with either the platen feed screw 49 or the headstock traverse drive shaft 122. The actuator is therefore arranged to close the switch SS—2 when the hand lever is positioned to engage the feed mechanism for driving the platen feed screw and to close the switch SS—3 when the lever is set to engage the drive for the headstock.

As the forward starting switch FS is normally open the limit switches are normally closed, rocking of the hand lever 222 to the left (as viewed in Fig. 1) is operative to energize the solenoid SOL—1 and thus condition the transmission unit 162 for driving the platen to the left or for shifting the headstock upwardly. The drive for the platen is interrupted automatically by the opening of the limit switch LS—5 while upward movement of the headstock is interrupted by opening of the switch LS—1 when these elements reach the end of their travel.

To effect the traverse of these elements in the reverse direction, the hand lever 222 is rocked to the right to close the reverse starting switch RS, the switch FS also being closed under these conditions. Switch RS completes a circuit for a control relay CR—3 which closes a switch CR—31 to energize solenoid SOL—2. The control relay additionally closes switches CR—32 and CR—33 to bypass the limit switches LS—1 and LS—5 and thereby complete the chain circuit for energizing solenoid SOL—1. Switch CR—34 is also opened to remove a shunt from around limit switches LS—2 and LS—6 so that these switches may function during reverse movement of the elements with which they are associated. As previously stated, energization of both solenoids reverses the transmission unit 162 and thereby the direction of movement of the platen or the headstock. Limit switches LS—2 and LS—5 interrupt the drive, as previously explained, when either of the elements with which they are associated reaches the end of its travel.

The control circuit for the transmission unit 300 operates in substantially the same manner as the control circuit above described for energizing the solenoid SOL—3 alone or for energizing that solenoid and solenoid SOL—4 simultaneously. The first mentioned solenoid is connected in series with limit switches LS—3 and LS—4, both of which are normally closed. Closure of forward switch FS—1 by rocking the hand lever 335 to the right completes an energizing circuit for the solenoid SOL—3 which conditions the transmission unit for driving the table slide 250 to the right (as viewed in Fig. 8). The solenoid circuit is opened and the drive thus automatically interrupted by opening of the limit switch LS—3 as the slide reaches the end of its travel.

To reverse the movement of the table slide, hand lever 335 is rocked to the left thereby closing both forward switch FS—1 and reverse switch RS—1 to energize a control relay CR—4. This relay closes switch CR—41 to energize solenoid SOL—4 and in addition closes a switch CR—42 to complete a shunt around the opened limit switch LS—3. Solenoid SOL—3 is accordingly energized and, with its companion solenoid, conditions the transmission unit for driving the table slide to the left. Relay CR—4 when energized also opens switch CR—43 to open a shunt around the limit switch LS—4 so that this switch is operative to interrupt the drive when the slide reaches the limit of its travel to the left.

The hand lever 335 is also operable in the manner above described to control the direction of rotation of the work table 250 since the table may be coupled with the drive mechanism by manipulation of the clutch shifting lever 326. Moreover, the duplicate control lever 335' is operative to control the movements of either the table slide or the table in exactly the same manner as the lever 335 by reason of the mechanical interconnection between these controls. The traverse speed of both elements is controlled, of course, by rocking the hand lever in a transverse plane as hereinbefore described.

It will be apparent that aside from the starting and stopping the spindle driving motor and the feed motor, all functions of the machine may be controlled through the manipulation of the hand levers 222 and 335, or their companion duplicate control levers 222' and 335'. More specifically the direction of movement of the platen, the headstock and tailstock, the work table and the table slide and the rate of such movement is completely under the control of the attendant through the medium of the control levers mentioned.

Resumé

It will be apparent from the foregoing that the invention provides a machine tool of novel and improved construction which is readily adaptable for performing a wide variety of machine operations. By reason of the novel assembly of the headstock and tailstock columns on a translatable platen for movement therewith as a unit, relative to the work, the tool is given uniform, rigid support under all operating conditions. Since the position of the tool remains unchanged, any deflection thereof remains constant throughout the boring cycle and the machine is therefore enabled to operate with the greatest precision.

The invention also provides a novel and advantageous arrangement of controls so that full control of both the direction and rate of movement of the machine element in motion at any time is centered in a single hand lever. The ease and accuracy of control thus provided greatly facilitates the setting up and operation of the machine thereby materially increasing its productive capacity.

The drive arrangement is particularly advantageous in adapting the machine for a wide variety of machining operations. In particular, the provision of separate drive mechanisms for the tool and work supporting structures provides maximum flexibility in the feeds of the various elements. Moreover, the arrangement whereby one feed mechanism is available for driving either the platen or the headstock while the other feed mechanism is available for driving either the work table or the table slide results in a substantial simplification of the mechanical elements of the drive and the controls therefore. In general, therefore, it will be apparent that the invention provides a machine tool in which simplicity has been attained without sacrifice of flexibility and which is particularly well suited for precision work under heavy duty operating conditions.

We claim as our invention:

1. A horizontal boring machine having in combination, an elongated bed, a platen supported on said bed for movement longitudinally thereof, an upright column mounted at each end of the platen, a spindle headstock supported on one of said columns for movement in a vertical plane, a tailstock mounted on the other of said columns for movement in a vertical plane, said headstock and said tailstock acting jointly to support a boring tool or the like, a bridging member extending transversely across said bed and said platen intermediate said columns, a work supporting table carried by said bridging member, power driving mechanism supported in said bed, a pair of shafts extending from said mechanism parallel to the path of movement of said platen, means associated with one of said shafts operative to traverse the headstock and tailstock in synchronism for adjusting the position of the tool with respect to a workpiece supported on said table, means associated with the other shaft operative to traverse said platen for feeding the tool to the work, and means operable selectively to condition said mechanism to drive either shaft selectively.

2. A horizontal boring machine having, in combination, an elongated bed, a platen supported on said bed for movement longitudinally thereof, an upright column mounted at each end of the platen, a spindle headstock supported on one of said columns for movement in a vertical plane, a tailstock mounted on the other of said columns for movement in a vertical plane, said headstock and said tailstock acting jointly to support a boring tool or the like, a bridging member extending transversely across said bed and said platen intermediate said columns, a work supporting table carried by said bridging member, drive means operative to traverse said headstock and said tailstock in synchronism for adjusting the position of the tool with respect to a workpiece supported on said table, other drive means operative to traverse said platen for feeding the tool to the workpiece, a prime mover, and means operable to connect said prime mover with either drive means selectively.

3. A horizontal boring machine having, in combination, an elongated bed, a platen supported on said bed for movement longitudinally thereof, an upright column mounted at each end of the platen, a spindle headstock supported on one of said columns for movement in a vertical plane, a tailstock mounted on the other of said columns for movement in a vertical plane, said headstock and said tailstock acting jointly to support a boring tool or the like, a bridging member extending transversely across said bed and said platen intermediate said columns, a work supporting table carried by said bridging member, drive means operative to traverse said headstock and said tailstock in synchronism for adjusting the position of the tool with respect to a workpiece supported on said table, and other drive means operative to traverse said platen for feeding the tool to the workpiece.

4. A horizontal boring machine having, in combination, an elongated bed, a platen supported on said bed for movement longitudinally thereof, an upright column mounted at each end of the platen, a spindle headstock carried on one of said columns, a tailstock carried on the other of said columns in alinement with said headstock and adapted to cooperate therewith in supporting a boring tool or the like, a bridging member mounted on said bed and extending over said platen intermediate said columns, a work supporting table carried by said bridging member, and means for traversing said platen to feed the tool to a workpiece supported on said table.

5. In a machine of the type described, in combination, an elongated main bed, auxiliary bed members arranged at the front and rear of the main bed intermediate the ends thereof, a bridging member mounted on said auxiliary bed members and extending across the main bed, a platen slidably supported on said main bed below said bridging member for reciprocation longitudinally of the main bed, a pair of columns mounted on said platen on opposite sides of said bridging member, a headstock carried by one column, a tailstock carried by the other column, said headstock and said tailstock cooperating to support a boring tool or the like above said bridging member, a slide supported on the bridging member for movement transversely of the main bed, a work supporting table carried by said slide, and driving mechanisms acting on said headstock, said tailstock, said slide and said platen to effect three dimensional relative movements between the tool and a workpiece supported on said table.

6. In a machine of the type described, in combination, an elongated main bed, auxiliary bed members arranged at the front and rear of the main bed intermediate the ends thereof, a bridging member mounted on said auxiliary bed members and extending across the main bed, a platen slidably supported on said main bed below said bridging member for reciprocation longitudinally of the main bed, a pair of columns mounted on said platen on opposite sides of said bridging member, a headstock carried by one column, a tailstock carried by the other column, said headstock and said tailstock cooperating to support a boring tool or the like above said bridging member, a slide supported on the bridging member for movement transversely of the main bed, said platen and said slide being independently driven to effect two dimensional relative movements therebetween, a work supporting table mounted on said slide for rotation about a vertical axis, and means for driving said table.

7. In a machine of the type described, in combination, an elongated main bed, auxiliary bed members arranged at the front and rear of the main bed intermediate the ends thereof, a bridging member mounted on said auxiliary bed members and extending across the main bed, a platen slidably supported on said main bed below said bridging member for reciprocation longitudinally of the main bed, a pair of columns mounted on said platen on opposite sides of said bridging member, a headstock carried by one column, a tailstock carried by the other column, said headstock and said tailstock cooperating to support a boring tool or the like above said bridging member, a slide supported on the bridging member for movement transversely of the main bed, a work supporting table rotatably supported on said slide, drive mechanism operable selectively to traverse said slide or to rotate said table, and other drive mechanism operative to traverse said platen for effecting a feeding movement of the tool relative to a workpiece carried on said table.

8. In a machine of the type described, in combination, an elongated main bed, auxiliary bed members arranged at the front and rear of the main bed intermediate the ends thereof, a bridging member mounted on said auxiliary bed members and extending across the main bed, a platen slidably supported on said main bed below said bridging member for reciprocation longitudinally of the main bed, a pair of columns mounted on said platen on opposite sides of said bridging member, a headstock carried by one column, a tailstock carried by the other column, said headstock and said tailstock cooperating to support a boring tool or the like above said bridging member, a slide supported on the bridging member for movement transversely of the main bed, a work supporting table rotatably supported on said slide, power driving mechanism disposed in one of said auxiliary bed members, a pair of shafts extending from said mechanism parallel to the path of movement of said slide, means associated with one of said shafts operative to traverse the slide relative to the bridging member, means associated with the other of said shafts operative to rotate said table, and means operable selectively to condition said mechanism to drive either shaft selectively.

9. A machine tool having, in combination, an elongated horizontal bed, a platen supported on said bed for movement longitudinally thereof, a stationary bridging member extending over said bed, a slide supported on said bridging member for movement transversely of said platen, a work supporting table mounted on said slide, a pair of upright columns mounted on said platen on opposite sides of said table, a headstock carried on one column, a tailstock carried on the other column, said headstock and said tailstock cooperating to support a boring tool or the like in position to operate on a workpiece supported on said table, driving mechanism for the platen, driving mechanism for the slide, a prime mover operative to drive both mechanisms, and control means associated with each mechanism operable to reverse the driving effect of that mechanism independently of the other mechanism.

10. A machine tool having, in combination, an elongated horizontal bed, a platen supported on said bed for movement longitudinally thereof, a stationary bridging member extending over said bed, a slide supported on said bridging member for movement transversely of said platen, a work supporting table mounted on said slide, a pair of upright columns mounted on said platen on opposite sides of said table, a headstock carried on one column, a tailstock carried on the other column, said headstock and said tailstock cooperating to support a boring tool or the like in position to operate on a workpiece supported on said table, driving mechanism for the platen, driving mechanism for the slide, a prime mover operative to drive both mechanisms, and means interposed between the prime mover and each of said driving mechanisms operable to vary the speeds of the mechanisms independently.

11. A machine tool having, in combination, an elongated horizontal bed, a platen supported on said bed for movement longitudinally thereof, a stationary bridging member extending over said bed, a slide supported on said bridging member for movement transversely of said platen, a work supporting table mounted on said slide, a pair of upright columns mounted on said platen on opposite sides of said table, a headstock carried on one column, a tailstock carried on the other column, said headstock and said tailstock cooperating to support a boring tool or the like in position to operate on a workpiece supported on said table, driving mechanism for the platen, driving mechanism for the slide, a prime mover operative to drive both mechanisms, and a hydraulic transmission interposed between said prime mover and each mechanism, said hydraulic transmissions being independently adjustable with reference to speed and direction of drive.

12. In a machine tool, in combination, a translatable platen, a bridging member extending over said platen, a pair of upright supports mounted on said platen on opposite sides of the bridging member and extending above the member, one of said supports being adjustable on the platen in the direction of its movement, power driven means operative to reciprocate said platen, a pair of control devices associated with said power driven means operable to interrupt the movements of the platen in either direction, and actuators movable with the platen positioned to operate said control devices alternately as the respective supports approach said bridging member, one of said actuators being shiftable relative to the platen with the adjustably mounted support.

13. In a machine tool, in combination, a platen supported for reciprocation, a stationary bridging member extending over said platen, a support rigidly mounted on said platen at one side of said member, a support adjustably mounted on the platen at the other side of the platen, power driven means for reciprocating said platen to carry said supports alternately toward and from said member, safety control means operable to interrupt the drive as either support approaches the member, said control means including a pair of stationarily supported limit switches, a first switch actuator movable with the platen, and a second switch actuator movable with the platen and movable relative thereto with the adjustably mounted support.

14. A machine tool having, in combination, a platen supported for reciprocation, an upright column mounted on said platen, a headstock supported for vertical movement on said column, driving mechanism, means operable to couple said mechanism selectively for reciprocating the platen or for traversing the headstock, limit controls associated with the platen operative to determine the limits of its travel in either direction, other limit controls associated with the headstock operative to determine the limits of its travel in either direction, and means operable by said coupling means to disable the limit controls for the headstock when the platen is being reciprocated and for disabling the limit controls for the platen when the headstock is being traversed.

15. A machine tool having, in combination, a platen supported for reciprocation, an upright column mounted on said platen, a headstock supported for vertical movement on said column, driving mechanism, means operable to couple said mechanism selectively for reciprocating the platen or for traversing the headstock, a pair of limit switches arranged for actuation alternately as the platen approaches the respective limits of its travel in opposite directions and operative to interrupt the movement thereof, a pair of limit switches arranged for actuation alternately as the headstock approaches the upper and lower limits of its travel on the column, and switch mechanism operable by said coupling means to establish a shunt around either pair of limit switches when the machine element with which the other pair of limit switches is associated is being driven.

16. A machine tool of the class described having, in combination, a reciprocable platen, an upright column, a headstock supported for vertical movement in said column, driving mechanism including a reversible variable speed transmission, a single hand lever operable to regulate the direction and speed of said transmission, and means operable to connect said transmission for driving either the platen or the headstock, said single hand lever being effective to control the speed and direction of movement of either the platen or the headstock.

HANS B. KRAUT.
KEITH F. GALLIMORE.
EVERETT K. MORGAN.

REFERENCES CITED

The following references are of record in the file of this patent:

UNITED STATES PATENTS

| Number | Name | Date |
|---|---|---|
| 2,255,176 | Lucas et al. | Sept. 9, 1941 |
| 1,817,036 | Kearney et al. | Aug. 4, 1931 |
| 2,297,422 | Mobius et al. | Sept. 29, 1942 |
| 2,105,288 | Linden et al. | Jan. 11, 1938 |
| 2,339,435 | Stephan | Jan. 18, 1944 |
| 2,315,877 | Snyder | Apr. 6, 1943 |
| 2,224,108 | Ridgway | Dec. 3, 1940 |